US005079738A

United States Patent [19]

Bockenfeld

[11] Patent Number: 5,079,738

[45] Date of Patent: Jan. 7, 1992

[54] PROCESSOR INTERCONNECT NETWORK FOR PRINTING PRESS SYSTEM FORMING A STAR NETWORK

[75] Inventor: Donald Bockenfeld, Bronx, N.Y.

[73] Assignee: Rockwell International Corporation, El Segundo, Calif.

[21] Appl. No.: 414,568

[22] Filed: Sep. 29, 1989

[51] Int. Cl.[5] .......................... H04J 3/02; G06F 13/10

[52] U.S. Cl. .............................. 395/800; 364/DIG. 1

[58] Field of Search .................... 101/148; 370/85, 89; 364/900, 200, 478

[56] References Cited

U.S. PATENT DOCUMENTS

| | | | |
|---|---|---|---|
| 4,667,323 | 5/1987 | Engdahl et al. | 370/85 |
| 4,757,497 | 7/1988 | Beierle et al. | 370/89 |
| 4,803,634 | 2/1989 | Kinichiro et al. | 364/478 |
| 4,899,653 | 2/1990 | Michl et al. | 101/148 |

OTHER PUBLICATIONS

William Stallings, Data and Computer Communications (New York: Macmillan Pub. Co., 1985) 385-394.

*Primary Examiner*—Dale M. Shaw
*Assistant Examiner*—Andrew Bodendorf
*Attorney, Agent, or Firm*—C. B. Patti; V. L. Sewell; H. F. Hamann

[57] ABSTRACT

A processor interconnect network (PIN) for operating a printing press having a plurality of different modules each containing a processor. The PIN has: a control for communicating having a plurality of ports connected to the plurality of processors in the modules of the printing press in a one-to-one correspondence and each of the modules being equivalent to a node in a local area network and having a unique address. In the processor interconnect network the control and the plurality of modules form substantially a star network. Addition modules can be connected to unused available ports of the control without substantial change to opeating the star network.

4 Claims, 19 Drawing Sheets

APCS UNIT CONTROLLER: COMMUNICATIONS PROCESSOR BLOCK DIAGRAM

| BACKPLANE PIN | 68230 PIN | MEANING | SENSE |
|---|---|---|---|
| P2-C2 | PA0 - In | PCSR exists | 0 = yes |
| P2-3A | PA1 - In | PCSL exists | 0 = yes |
| P2-3C | PA2 - In | PLAN exists | 0 = yes |
| P2-4A | PA3 - In | RTP is on the PLAN | 0 = yes |
| P2-4C | PA4 - In | Local PLAN is "right" | 0 = yes |
| P2-5A | PA5 - In | Shareable left | 0 = yes |
| P2-5C | PA6 - In | Shareable right | 0 = yes |
| P2-6A | PA7 - In | Error log baud rate | 0 = high speed |
| P2-10C | PB0 - OUT | Busy/Idle Indicator | 0 = busy |
| P2-10A | PB1 | Unused | |
| P2-9C | PB2 | Unused | |
| P2-9A | PB3 | Unused | |
| P2-8C | PB4 | Unused | |
| P2-8A | PB5 | Unused | |
| P2-7C | PB6 | Unused | |
| P2-7A | PB7 | Unused | |

FIG.8

| BOARD | PORT | PHYSICAL LAYER | ASSIGNMENT |
|---|---|---|---|
| Omnibyte SBC | A | RS-232 | Error logging and diagnostics |
| Omnibyte SBC | B | RS-232 | UNUSED |
| SBE #1 | 0 | RS-485 | UNUSED |
| SBE #1 | 1 | RS-485 | DRINK #1 (couples 1 and 2) |
| SBE #1 | 2 | RS-485 | DRINK #2 (couples 3 and 4) |
| SBE #1 | 3 | RS-485 | DRINK #3 (couples 5 and 6) |
| SBE #1 | 4 | RS-485 | DRINK #4 (couples 7 and 8) |
| SBE #1 | 5 | RS-485 | MAC |
| SBE #1 | 6 | RS-485 | RTP |
| SBE #1 | 7 | RS-485 | UNUSED |
| SBE #2 | 0 | RS-485 | PLAN |
| SBE #2 | 1 | RS-485 | Unit panel |
| SBE #2 | 2 | RS-485 | PCSR |
| SBE #2 | 3 | RS-485 | PCSL |
| SBE #2 | 4 | RS-485 | UNUSED |
| SBE #2 | 5 | RS-485 | UNUSED |
| SBE #2 | 6 | RS-485 | UNUSED |
| SBE #2 | 7 | RS-485 | Page displays |

FIG.9

PROCESSOR INTERCONNECT NETWORK FOR PRINTING PRESS SYSTEM FORMING A STAR NETWORK

BACKGROUND OF THE INVENTION

The present invention relates to offset printing presses and, particularly, to the electronic control of such presses.

Web offset printing presses have gained widespread acceptance by metropolitan daily as well as weekly newspapers. Such presses produce a quality black and white or color product at very high speeds. To maintain image quality, a number of printing functions must be controlled very precisely as the press is operating. These include the control of press speed, the control of color register, the control of ink flow and the control of dampening water.

In all printing processes there must be some way to separate the image area from the non-image area. This is done in letterpress printing by raising the image area above the non-image area and is termed "relief printing". The ink roller only touches the high part of the plate, which in turn, touches the paper to transfer the ink. In offset lithography, however, the separation is achieved chemically. The lithographic plate has a flat surface and the image area is made grease-receptive so that it will accept ink, and the nonimage area is made water-receptive so it will repel ink when wet.

In a web offset printing press the lithographic plate is mounted to a rotating plate cylinder. The ink is injected onto an ink pickup roller and from there it is conveyed through a series of transfer rollers which spread the ink uniformly along their length and transfer the ink to the image areas of the rotating plate. Similarly, dampening water is applied to a fountain roller and is conveyed through one or more transfer rollers to the non-image areas of the rotating plate cylinder. The plate cylinder rotates in contact with a blanket cylinder which transfers the ink image from the plate cylinder to the moving paper web.

It is readily apparent that the amount of ink and dampening water supplied to the plate cylinder is directly proportional to the press speed. At higher press speeds the plate cylinder and blanket cylinder transfer ink and water to the paper web at a higher rate, and the inking and dampening systems must, therefore, supply more ink and water. It is also well known that this relationship is not linear and that the rate at which ink and dampening water is applied follows a complex rate curve which is unique to each press and may be unique to each run on a press. Not so apparent is the fact that the ink and water may be applied non-uniformly across the width of the ink pickup roller and the fountain roller in order to achieve uniform printing quality along the width of the web. If this is not done, there may be significant changes in the quality of the printed images across the width of the moving web.

Prior press control systems have provided limited control over the rate at which dampening water and ink has been applied as a function of press speed. For example, in the case of damping water, these systems pulse the nozzles on the spray bar on and off at one of a plurality of selectable pulse rates. The particular pulse rate selected is determined by the press speed. The particular pulse rates and selection points between pulse rates is preset to follow the dampening rate curve of the press as closely as possible. There is no means for easily changing these values or for providing a continuous range of pulse rates which closely follow the rate curve. In addition, while the amount of dampening water applied by the spray bar can be adjusted over the width thereof, this is a manual adjustment which may only be made locally at a spray bar controller. Thus, if inconsistencies in print quality are observed over the width of the image, manual adjustments to the circuitry must be made at a local control panel.

Furthermore these features, as well as others are controlled by hard-wired circuitry in prior art printing presses. Thus prior art printing presses are very limited in their versatility. The present invention overcomes these drawbacks of the prior art.

SUMMARY OF THE INVENTION

An object of the present invention is to improve an improved control system for an offset printing press.

A processor interconnect network (PIN) for operating a printing press having a plurality of different modules each containing a means for processing. The PIN has the following elements; a control means for communicating having a plurality of ports connected to the plurality of means for processing in the modules of the printing press in a one-to-one correspondence; each of the modules is equivalent to a node in a local area network and has a unique address; the processor interconnect network operates independently of the port of control means to which each module is connected; the processor interconnect network is a network layer of an International Standards Organization (ISO) model, the model also having in order of decreasing hierarchy from the network layer a data link layer, a physical layer and a physical medium; and the control means and the modules provide distributed computing power for the processor interconnect networks, and the modules communicate with one another via the control means. Addition modules can be connected to unused available ports of the control means without substantial change to operating the star network. The modules are composed of at least a plurality of DRINKS, each having a unique address. Each of the DRINKS has a plurality of functions operating in response to instructions received via the central means.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 8 and FIG. 9 ar charts digital I/O assignments and serial port assignments, respectively.

FIG. 10 is a flow diagram depicting operation of the processor interconnect network of the present invention;

FIG. 11 is a flow diagram depicting message flow to ports;

FIG. 12 is a flow diagram depicting routing of message packets;

FIG. 13 is a flow diagram depicting power ups, reconnections and changes;

FIG. 14 is a flow diagram depicting updating of page displays;

FIG. 15 is a flow diagram depicting maintaining clock and calendar;

FIG. 16 is a flow diagram depicting RTP message handling;

FIG. 17 is a flow diagram depicting error display;

FIG. 18 is a flow diagram depicting communication between a port and a module;

FIG. 19 is a flow diagram depicting error communication between a port and a module;

FIG. 20 is a flow diagram depicting further communication between a port and a module;

FIG. 21 is a flow diagram depicting error reply communication between a port and a module;

FIG. 22 is a flow diagram depicting restart communication between a port and a module;

FIG. 23 is a flow diagram depicting protocol error communication between a port and a module; and FIG. 24 is a flow diagram depicting message distribution.

DESCRIPTION OF THE PREFERRED EMBODIMENT

Figure 1:
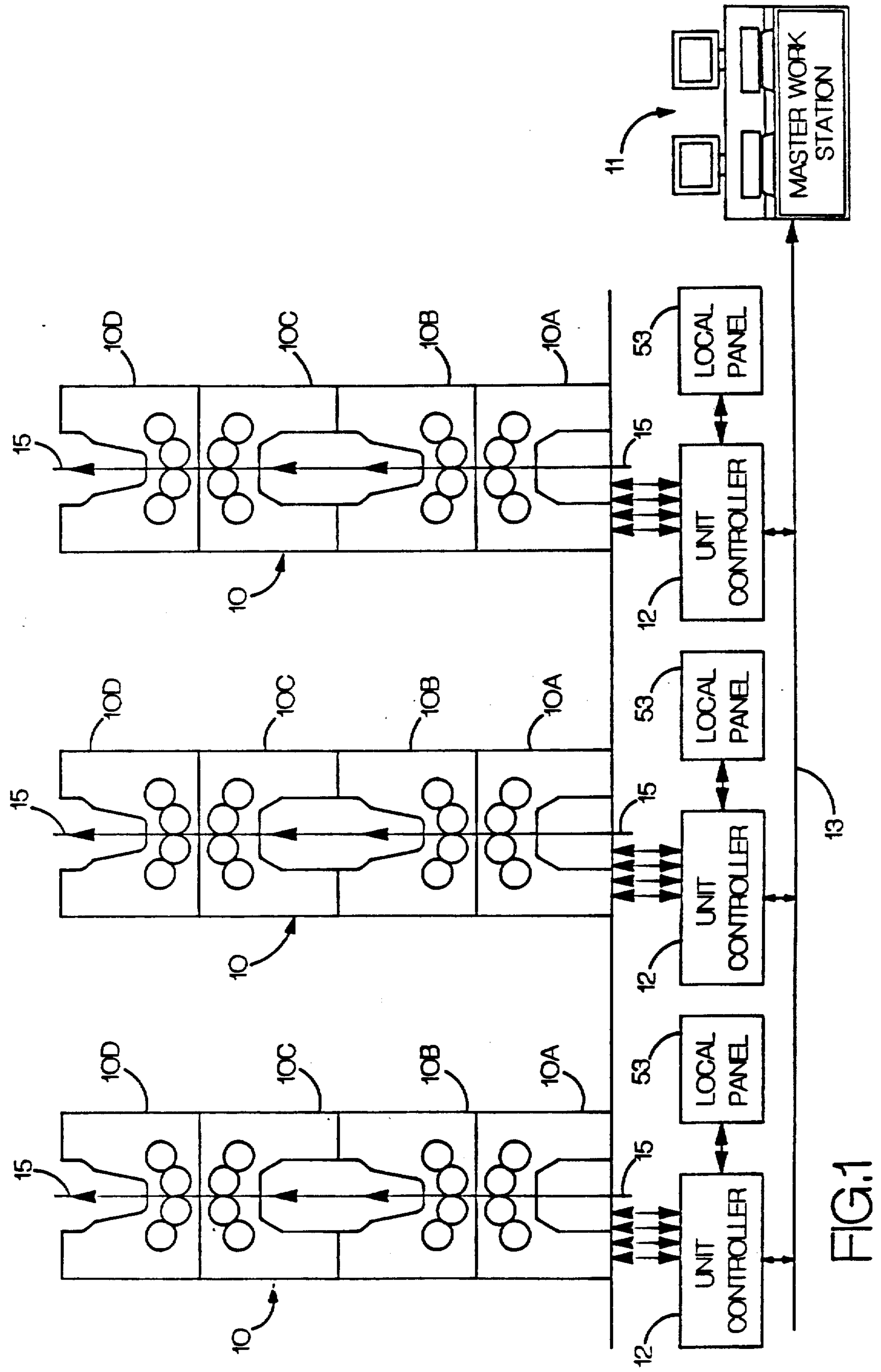
FIG. 1 is a schematic representation of a web offset printing press and its control system.

Referring particularly to FIG. 1, a printing press is comprised of one or more printing units 10 which are controlled from a master work station 11. Each printing unit is linked to the master work station by a unit controller 12 which communicates through a local area network 13. As described in U.S. Pat. No. 4,667,323 (hereby incorporated by reference), the master work station 11 and the unit controllers 12 may send messages to each other through the network 13 to both control the operation of the press and to gather production information..

Figure 2:
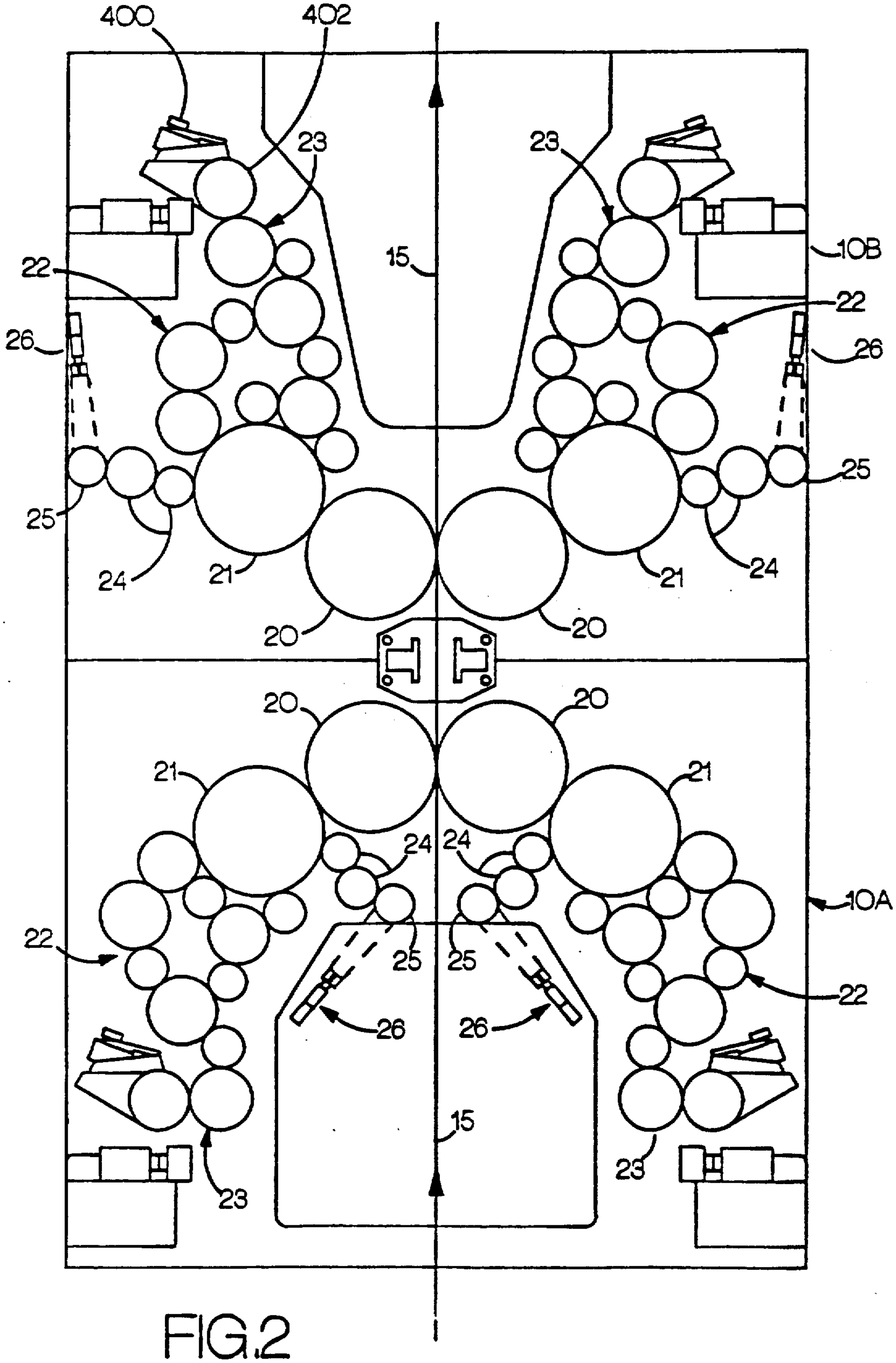
FIG. 2 is a schematic representation of two printing units in the press of FIG. 1.

Referring particularly to FIGS. 1 and 2, each printing unit 10 is comprised of four units which are referred to as levels A, B, C and D and which are designated herein as units 10A, 10B, 10C and 10D. The units 10A-D are stacked one on top of the other and a web 15 passes upward through them for printing on one or both sides. In the preferred embodiment shown, the printing units 10 are configured for full color printing on both sides of the web, where the separate units 10A-D print the respective colors blue, red, yellow and black.

As shown best in FIG. 2, each unit 10A-D includes two printing couples comprised of a blanket cylinder 20 and a plate cylinder 21. The web 15 passes between the blanket cylinders 20 in each unit for printing on both sides. Ink is applied to each plate cylinder 21 by a series of ink transfer rollers 2 which receive ink from an ink pickup roller 23. As is well known in the art, the ink transfer rollers 22 insure that the ink is distributed uniformly along their length and is applied uniformly to the rotating plate cylinder 21. An ink rail 400 applies ink to a distribution ink drum 402 which in turn transfers the ink to the ink pickup roller 23. Similarly, each plate cylinder 21 is supplied with dampening water by a pair of dampener transfer rollers 24 and a dampener rider roller 25. A spray bar assembly 26 applies dampening water to each of the dampener rider rollers 25.

The following is an example of one type of control required in the printing press.

Figure 3:
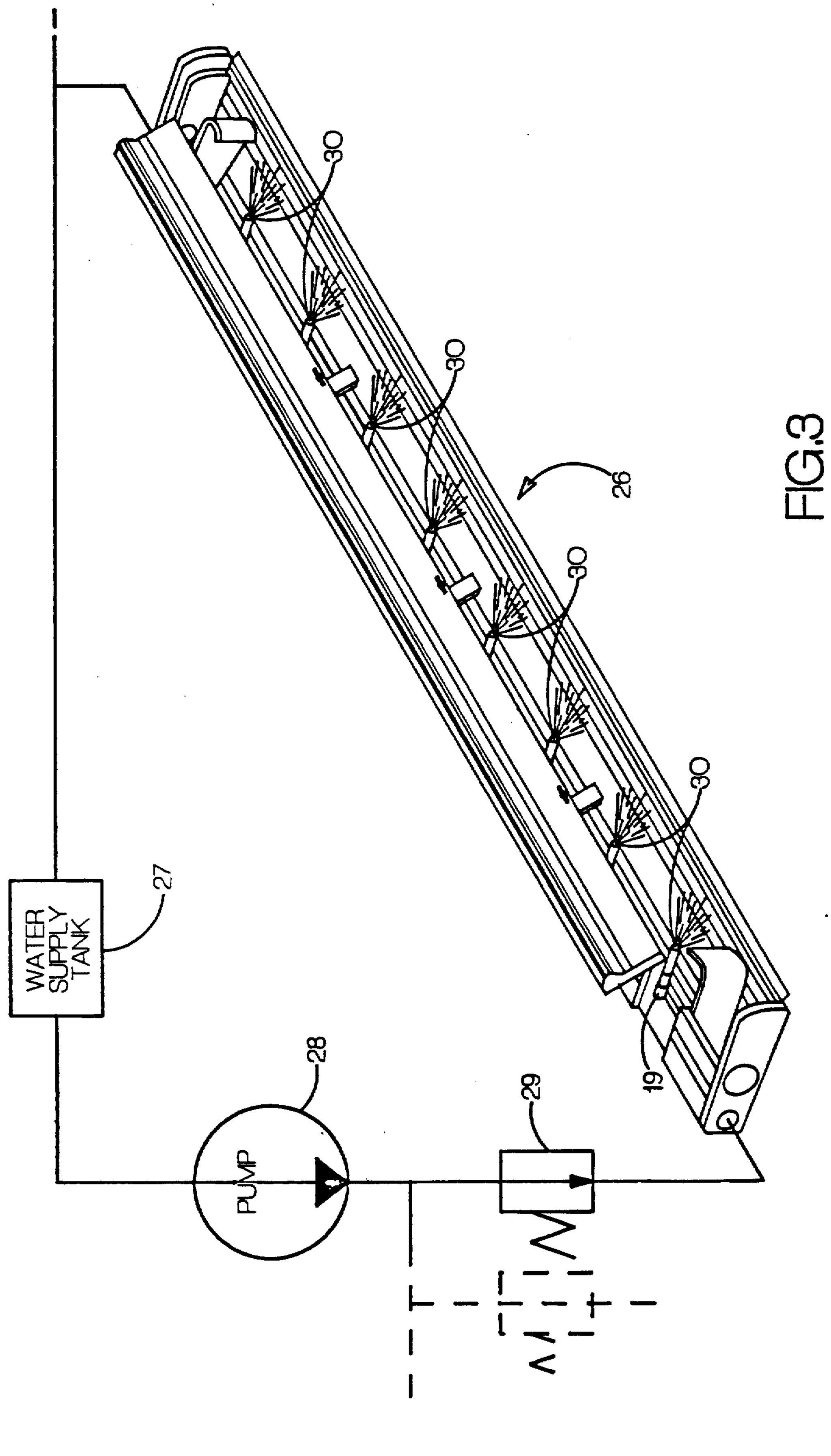
FIG 3 is a pictorial view of a dampening water spray bar which is employed in the printing units of FIG. 2.

Referring particularly to FIG. 3, each spray bar assembly 26 receives a supply of pressurized water from a water supply tank 27 through a pump 28 and solenoid valve 29. The spray bar assembly 26 includes eight nozzles 30 which each produce a flat, fan-shaped spray pattern of water when an associated solenoid valve 19 is energized. When all eight solenoid valves 19 are energized, a thin line of water is sprayed along the entire length of the associated dampener rider roller 25. As is well known in the art, the solenoid valves 19 are pulsed on and off at a rate which is proportional to press speed so that the proper amount of dampening water is applied and transferred to the plate cylinder 21. It is also well known that means must be provided for separately adjusting the amount of water sprayed by each nozzle 30 to account for variations in the distribution of dampening water over the length of the plate cylinder 21.

Figure 4:
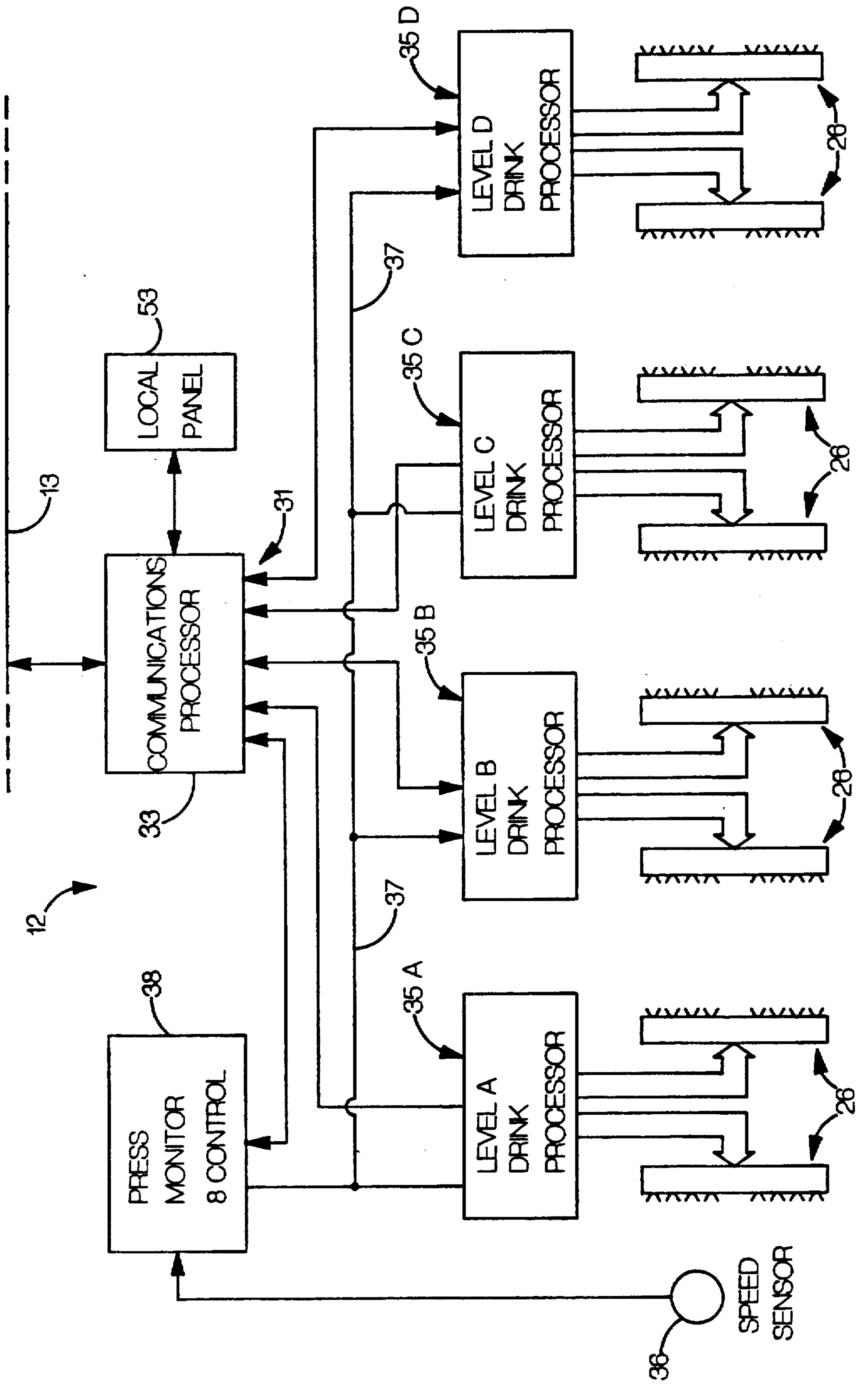
FIG. 4 is an electrical block diagram of a unit controller which forms part of the press control system of FIG. 1.

Referring to FIGS. 1 and 4, the spray bars 26 are operated by the unit controllers 12. Each unit controller includes a communications processor 30 of the type disclosed in the above-cited U.S. Pat. No. 4,667,323 which interfaces with the local area network 13. The communications processor 33 provides six serial communications channels 31- through which it can receive input messages for transmission on the network 13. Messages which are received through the network 13 by the communications processor 33 are distributed to the appropriate serial channel 33. The serial communications channels 33 employ a standard RS 422 protocol.

Four of the serial channels 33 connect to respective drink processors 35A, 35B, 35C and 35D. Each drink processor 35 is coupled to sensing devices and operating devices on a respective one of the levels A-D of the printing unit 10. In addition to receiving a press speed feedback signal through a pair of lines 37 of a and press monitor and control 38 from a speed sensor 36 mounted on the units 10A, each drink processor 35A-D produces output signals which control the solenoid valves 31 on the spray bars 26 and the 404 for the ink rail 400. The drink processors 35A-D also control color register.

Figure 5A:
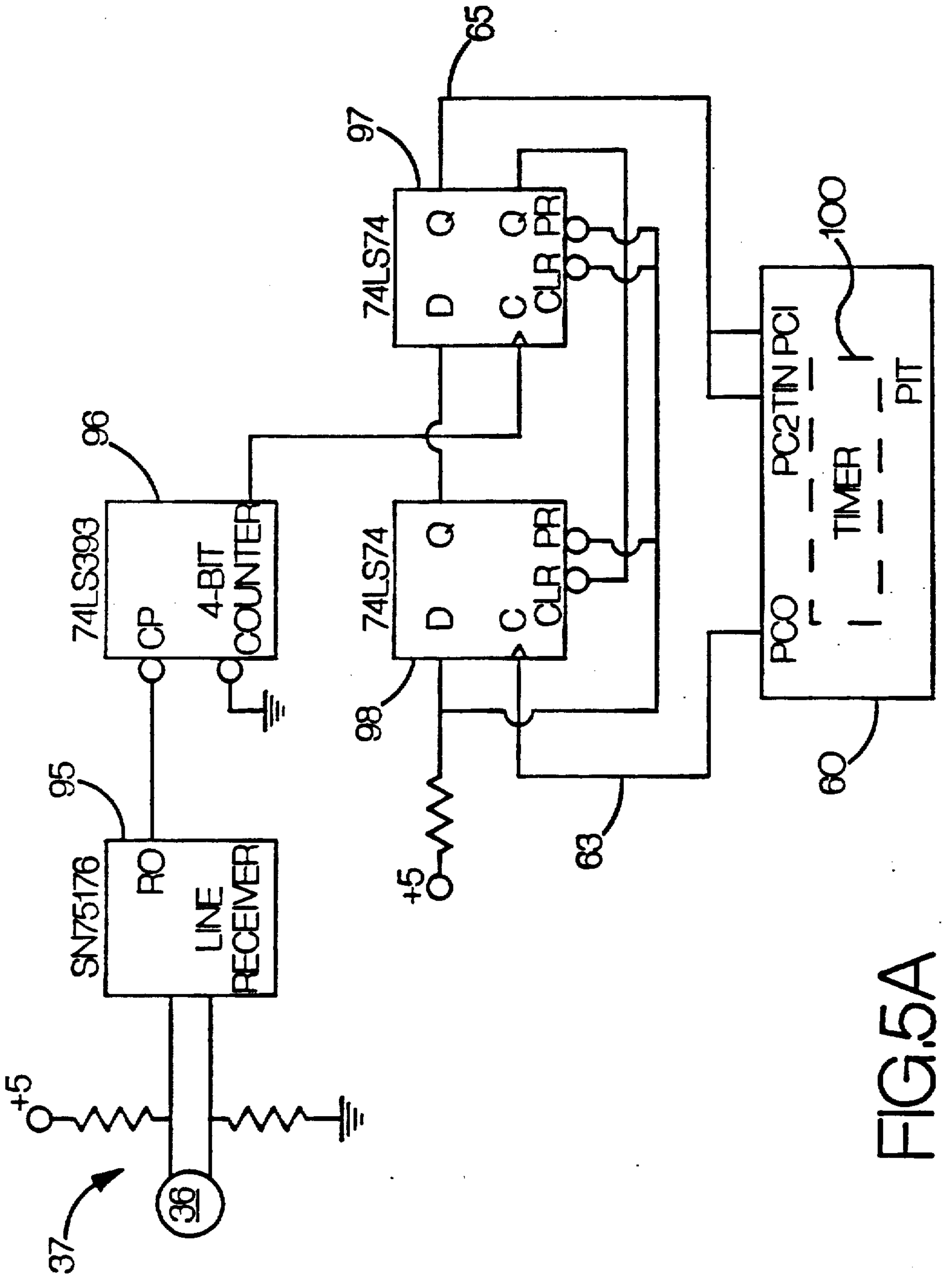
FIG. 5A is an electrical schematic diagraom of a speed interface circuit which forms part of the ink processor of FIG. 5.
Figure 5:
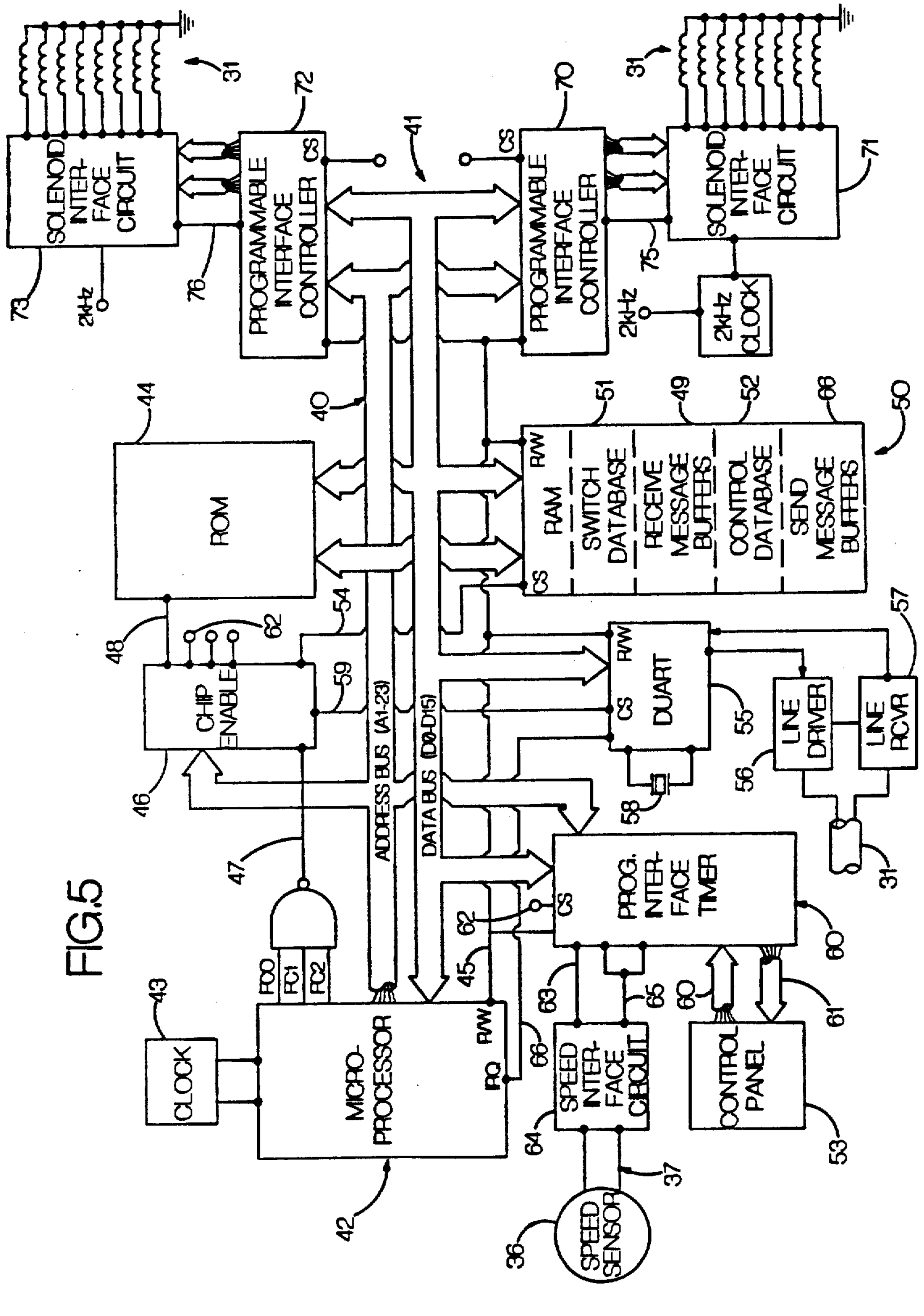
FIG. 5 is an electrical schematic diagram of a dampener, register, ink ("drink") processor which forms part of the unit controller of FIG. 4.

Referring particularly to FIG. 5, each drink processor 35 is structured about a 23-bit address bus 40 and a 16-bit data bus 41 which are controlled by a 16-bit microprocessor 42. The microprocessor 42 is a model 68000 sold commercially by Motorola, Inc. which is operated by a 10 mHz clock 43. In response to program instructions which are stored in a readonly memory (ROM) 44, the microprocessor 42 addresses elements of the drink processor 35 through the address bus 40 and exchanges data with the addressed element through the data bus 41. The state of a read/write (R/W) control line 45 determines if data is read from the addressed element or is written to it. Those skilled in the art will recognize that the addressable elements are integrated circuits which occupy a considerable address space. They are enabled by a chip enable circuit 46 when an address within their range is produced on the address bus 40. The chip enable circuit 46 is comprised of logic gates and three PAL16L8 programmable logic arrays sold commercially by Advanced Micro Devices, Inc. As is well known in the art, the chip enable circuit 46 is responsive to the address on the bus 40 and a control signal on a line 47 from the microprocessor 42 to produce a chip select signal for the addressed element. For example, the ROM 55 is enabled through a line 48 when a read cycle is executed in the address range $F00000 through $F7FFFF. The address space occupied by each of the addressable elements in the drink processor 35 is given in Table A.

TABLE A

| | | |
|---|---|---|
| ROM 44 | $F00000 | to $F7FFFF |
| RAM 50 | $000000 | to $06FFFF |
| Programmable Interface | | |
| Timer 60 | $300340 | to $30037F |
| Timer 100 | $300360 | |
| PCO | $300358 | |
| PC1 | $300358 | |
| Programmable Interface | | |
| Controller 70 | $300380 | to $3003BF |
| Timer 85 | $3003A0 | |
| Port PA | $300390 | |
| Port PB | $300392 | |
| PC3 | $300398 | |
| Programmable Interface | | |
| Controller 72 | $3003C0 | to $3003FF |
| DUART 55 | $200000 | to $20003F |

Referring still to FIG. 5, whereas the ROM 44 stores the programs or "firmware" which operates the microprocessor 42 to carry out the functions of the drink processor 35, a read/write random access memory (RAM) 50 stores the data structures which are employed to carry out these functions. As will be described in more detail below, these data structures include elements which are collectively referred to herein as a switch database 51, a control database 52, receive message buffers 49, and send message buffers 66. For example, the switch database 51 indicates the status of various switches on the local control panels 53, whereas the control database 52 stores data indicative of press speed, nozzle pulse rate, and nozzle pulse width and parameters for the ink injector system. The RAM 50 is enabled for a read or write cycle with the microprocessor 42 through a control line 54.

The drink processor 35 is coupled to one of the serial channels 31 of the communications processo 33 by a dual universal asynchronous receiver/transmitter (DUART) 55. The DUART 55 is commercially available as an integrated circuit model 68681 from Motorola, Inc. It operates to convert message data written to the DUART 55 by the microprocessor 42 into a serial bit stream which is applied to the serial channel 31 by a line drive circuit 56 that is compatible with the RS 422 standard. Similarly, the DUART 55 will receive a serial bit stream through a line receiver 57 and convert it to a message that may be read by the microprocessor 42. The DUART 55 is driven by a 3.6864 mHz clock produced by a crystal 58 and is enabled for either a read or write cycle through control line 59.

The press speed feedback signal as well as signals from the local control panel 53 are input to the drink processor 35 through a programmable interface timer (PIT) 60. The PIT 60 is commercially available in integrated circuit form as the model 68230 from Motorola, Inc. It provides two 8-bit parallel ports which can be configured as either inputs or outputs and a number of separate input and output points. In the preferred embodiment, one of the ports is used to input switch signals from the control panel 53 through lines 60, and the second port is used to output indicator light signals to the control panel 53 through lines 61. The PIT 60 is enabled through control line 62 and its internal registers are selected by leads A0–A4 in the address bus 40.

In addition to the parallel I/O ports, the PIT 60 includes a programmable timer/counter. This timer may be started and stopped when written to by the microprocessor 42 and it is incremented at a rate of 312.5 kHz by an internal clock driven by the 10 mHz clock 43. When the timer is started, a logic high pulse is also produced at an output 63 to a speed interface circuit 64. When the interface circuit 64 subsequently produces a pulse on input line 65, as will be described in detail below, the timer stops incrementing and a flag bit is set in the PIT 60 which indicates the timer has stopped. This flag bit is periodically read and checked by the microprocessor 42, and when set, the microprocessor 42 reads the timer value from the PIT 60 and uses it to calculate current press speed.

Referring still to FIG. 5, the solenoid valves 19 on each spray bar assembly 26 are operated through a programmable interface controller (PIC) 70 or 72 and an associated solenoid interface circuit 71 or 73. The PICs 70 and 72 are commercially available integrated circuits sold by Motorola, Inc. as the model 68230. Each includes a pair of 8-bit output registers as well as a single bit output indicated at 75 and 76. Each output register can be separately addressed and an 8-bit byte of data can be written thereto by the microprocessor 42. The two 8-bit bytes of output data are applied to the respective solenoid interface circuits 71 and 73. As will be explained in more detail below, the solenoid valves 19 are turned on for a short time period each time a pulse is produced at the single bit output of the PICs 70 and 72. This output pulse is produced each time an internal timer expires, and the rate at which the timer expires can be set to a range of values by the microprocessor 42. The time period which each solenoid valve 19 remains energized is determined by the operation of the solenoid interface circuits 71 and 73, which in turn can be separately configured by writing values to the registers in the PICs 70 and 72. As a result, the rate at which the spray bars 26 are pulsed on is under control of the programs executed by the microprocessor 42, and the duration of the spray pulses from each nozzle 19 of the spray bars 26 can be separately controlled. Similarly, an ink injector system for the ink rail 400 is connected via an interface 426 to the address bus 40 and the data bus 41. Operation is substantially equivalent to operation of the spray bars 26.

Figure 6:
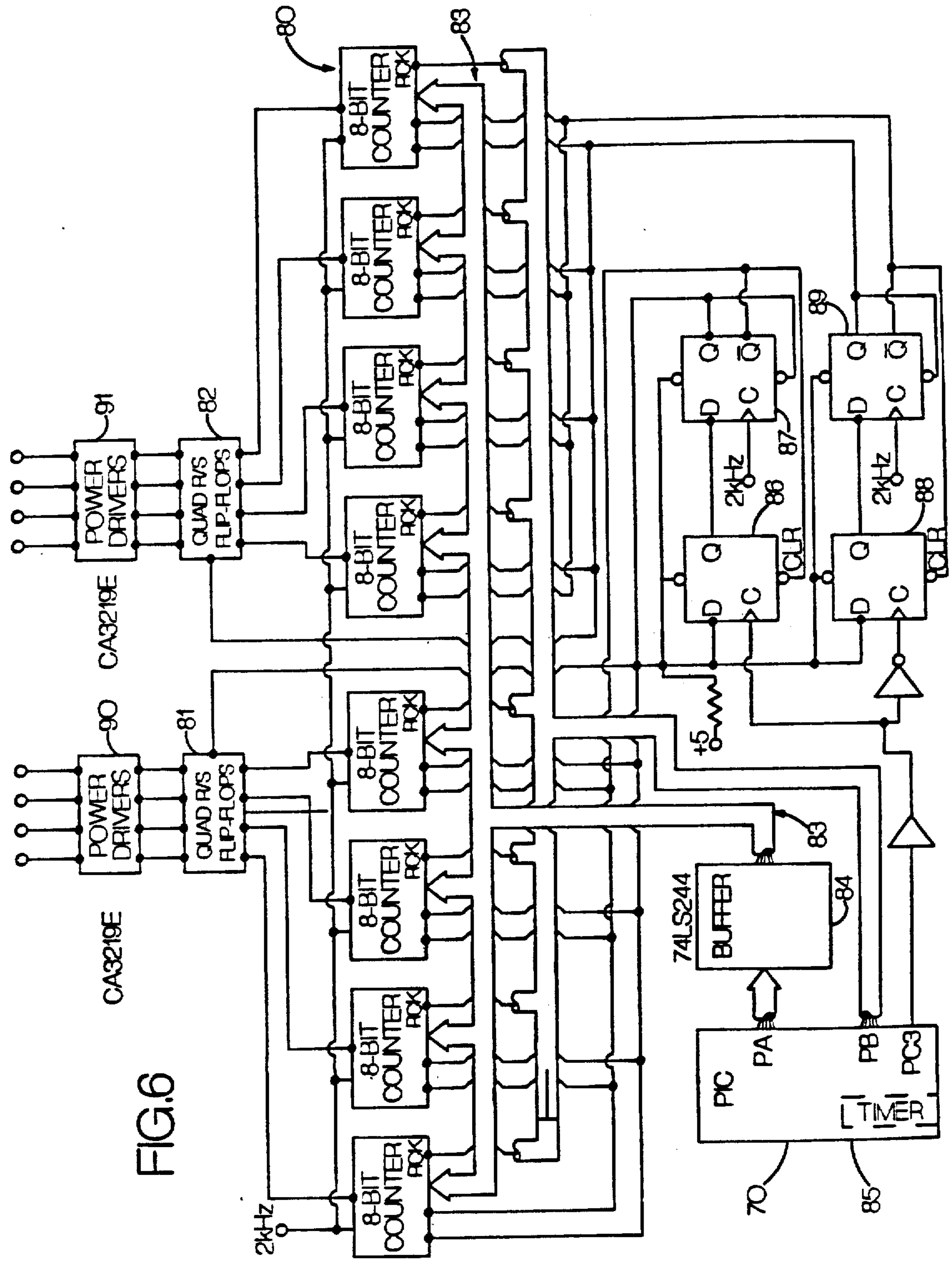
FIG. 6 is an electrical schematic diagram of a solenoid interface circuit which forms part of the drink processor of FIG. 5.

The solenoid interface circuit 71 is shown in FIG. 6 and it should be understood that the interface circuits 73 and 426 are virtually identical. Each includes a set of eight 8-bit binary counters 80 and a set of eight R/S flip-flops 81 and 82. The counters 80 are available in integrated circuit form as the 74LS592 from Texas Instruments, Inc. and they each include an internal 8-bit input register. This input register is loaded with an 8-bit binary number on output bus 83 when a pulse is applied to an RCK input of the counter 80. The RCK inputs of the eight counters 80 are connected to respective ones of the output terminals PB0–PB7 of the PIC 70, and the eight leads in the output bus 83 are driven by the output terminals PA0–PA7 of the PIC 70 through a buffer 84. Thus, any or all of the registers in the counters 80 can be loaded with a binary number on the PA output port of the PIC 70 by enabling the counter's RCK input with a "1" on the corresponding lead of the PB output port. As will be described in more detail below, this circuitry is used to separately preset each 8-bit counter 80 so that the time interval which each of the solenoid valves 19 remains on can be separately controlled.

Referring still to FIG. 6, an output pulse is produced at the PC3 output pin of the PIC 70 each time an internal timer 85 expires. The timer 85 is preset with a calculated current pulse rate value by the microprocessor 42. Each time the timer 85 expires, two phase displaced pulses are produced by a set of four D-type flip-flops 86–89. The Q output of flip-flop 87 sets the RS flip-flops 81 on the leading edge of one pulse and it presets four of the counters 80 with the values stored in their respective input registers. On the trailing edge of this first pulse, the $\overline{Q}$ output of the flip-flop 87 returns to a logic low which enables the same four counters to begin counting. The remaining four counters B0 and the R/S flip-flops 82 are operated in the same manner by the Q and $\overline{Q}$ outputs of the flip-flop 89. The only difference is that the operation of the flip-flop 89 is delayed one-half the time period between successive pulse from the flip-flop 87.

The eight counters 80 are incremented by 2 kHz clock pulses until they reach the all ones condition. At this point the output of the counter 80 goes to a logic low voltage and it resets the R/S flip-flop 81 or 82 to which it connects. The output of each R/S flip-flop 81 or 82 controls the operation of one of the solenoid valves 19 through power drivers 90 and 91 and, thus, each valve 19 is turned on when the flip-flops 81 and 82 are set, and they are each turned off as their associated counter 80 overflows and resets its R/S flip-flop. The outputs of the drivers 90 are connected to the first, third, fifth and seventh nozzle solenoids and the outputs of the drivers 91 are connected to the second, fourth, sixth and eighth nozzle solenoids. As a result, nozzles 1, 3, 5 and 7 are turned on each time a pulse is produced at PIC output terminal PC3 and nozzles 2, 4, 6 and 8 are turned on a short time interval later (i.e. greater than 5 milliseconds later). Each nozzle 19 is then turned off separately as their corresponding counters 80 overflow. It should be apparent, therefore, that the spray bar solenoids are pulsed on at the same rate, but the duration of each is left on, and hence the amount of dampening water delivered to the fountain roller 25, is separately controllable by the value of the 8-bit binary numbers loaded into the respective counter input registers.

Referring particularly to FIGS. 5 and 5A, the speed interface circuit 64 couples the digital incremented speed feedback signal received from the speed sensor 36 to the PIT 60. The speed sensor 36 produces a logic high voltage pulse for each incremental movement of the web through the printing unit. In the preferred embodiment, a magnetic sensor model 1-0001 available from Airpax Corporation is employed for this purpose, although any number of position feedback devices will suffice. The speed sensor's signal is applied to a line receiver 95 which produces a clean logic level signal that is applied to the input of a 4-bit binary counter 96. The counter 96 produces an output pulse each time sixteen feedback pulses are produced by the speed sensor 36. This overflow is applied to the clock terminal of a D-type flip-flop 97 which switches to a logic state determined by the logic state applied to its D input. The D input is in turn driven by a second flip-flop 98 which is controlled by the PCO output of the PIT 60 and the $\overline{Q}$ output of flip-flop 97.

When the press speed is to be sampled, a "1" is written to the PCO output of the PIT 60. This transition clocks the flip-flop 98 to set its Q output high and to thereby "arm" the circuit. As a result, when the next overflow of the 4-bit counter 96 occurs, the flip-flop 97 is set and a logic high voltage is applied to the PC2TIN and PC1 inputs of the PIT 6o. The $\overline{Q}$ output of flip-flop 97 also goes low to reset flip-flop 98 and to thereby disarm the circuit. As long as input PC2TIN is high, an internal timer 100 in the PIT 60 is operable to measure the time interval. The input PCl may be read by the microprocessor 42 to determine when a complete sample has been acquired. After sixteen feedback pulses have been received, the counter 96 again overflows to reset the flip-flop 97 and to thereby stop the timer 100 in the PIT 60. Input PCI also goes low, and when read next by the microprocessor 42, it signals that a complete sample has been acquired and can be read from the PIT 60. The entire cycle may then be repeated by again writing a "1" to the PCO output of the PIT 60.

While many means are available for inputting an indication of press speed, the speed feedback circuit of the present invention offers a number of advantages. First, the effects of electronic noise on the measured speed are reduced by the use of the counter 96. The error caused by a noise voltage spike on the input lines is effectively reduced to about one sixteenth the error that would result if speed were measured by sensing the feedback pulse rate directly. In addition, by using the timer in the PIT 60 to record the time interval and save the result, the microprocessor 42 is not burdened with a continuous monitoring of the speed feedback signal. Instead, when the system requires an updated sample of press speed, the microprocessor checks the PIT 60 and reads the latest value stored therein. It then initiates the taking of another sample and continues on with its many other tasks.

Figure 7:
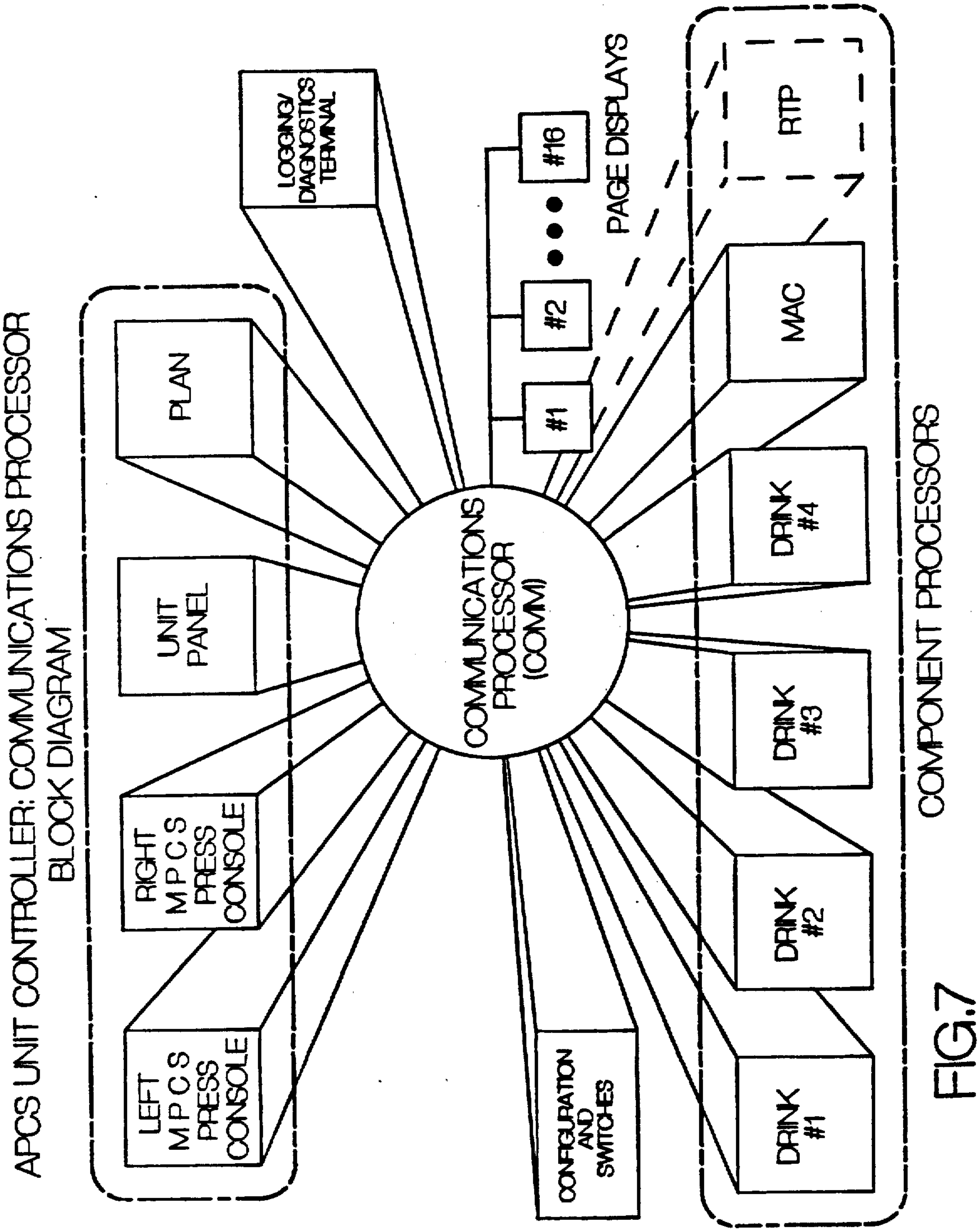
FIG. 7 is a general diagram of the system of the present invention.
Figure 10:
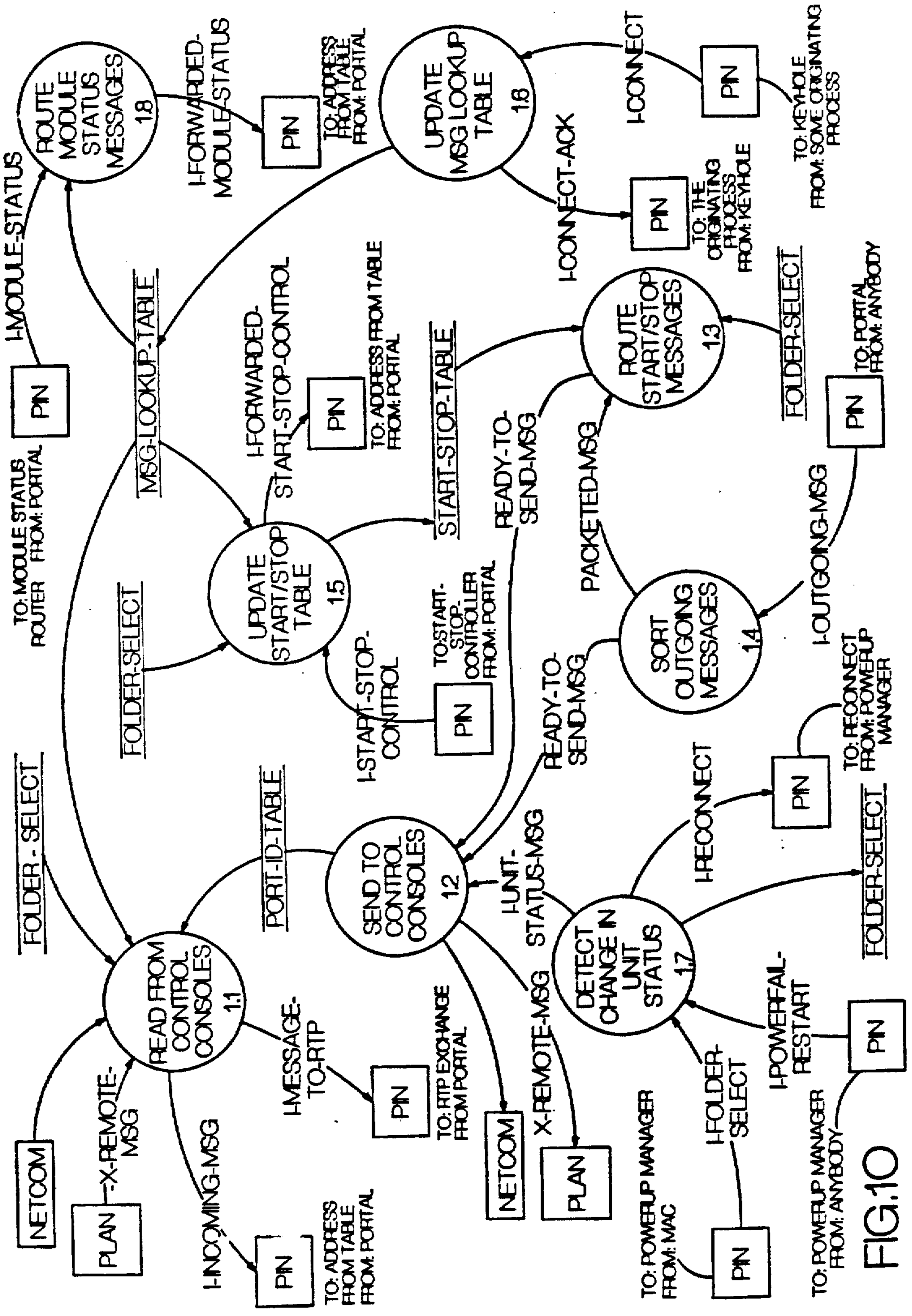
FIGS. 10 through 24 are flow diagrams depicting operation of the present invention.
Figure 11:
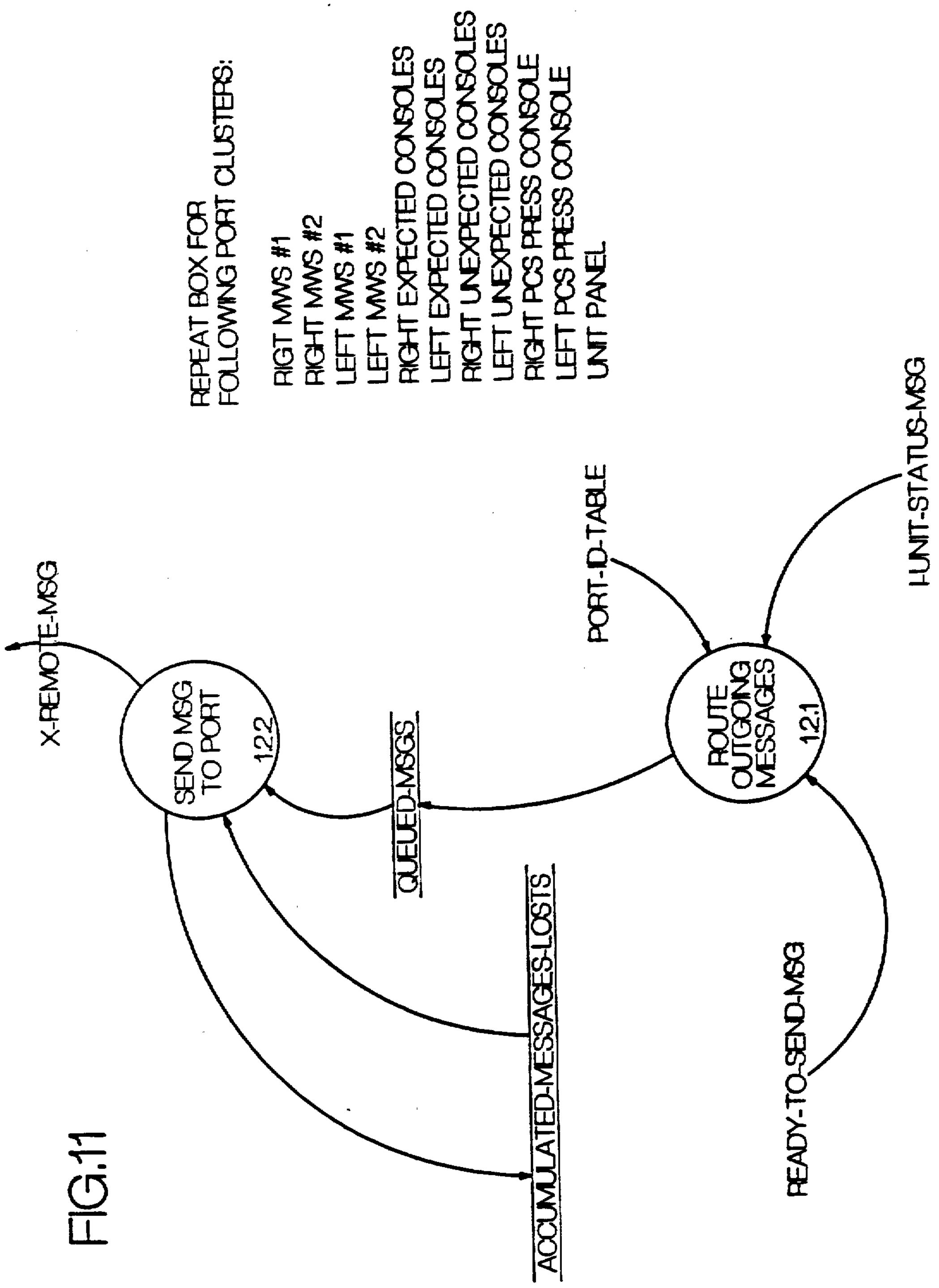
Figure 12:
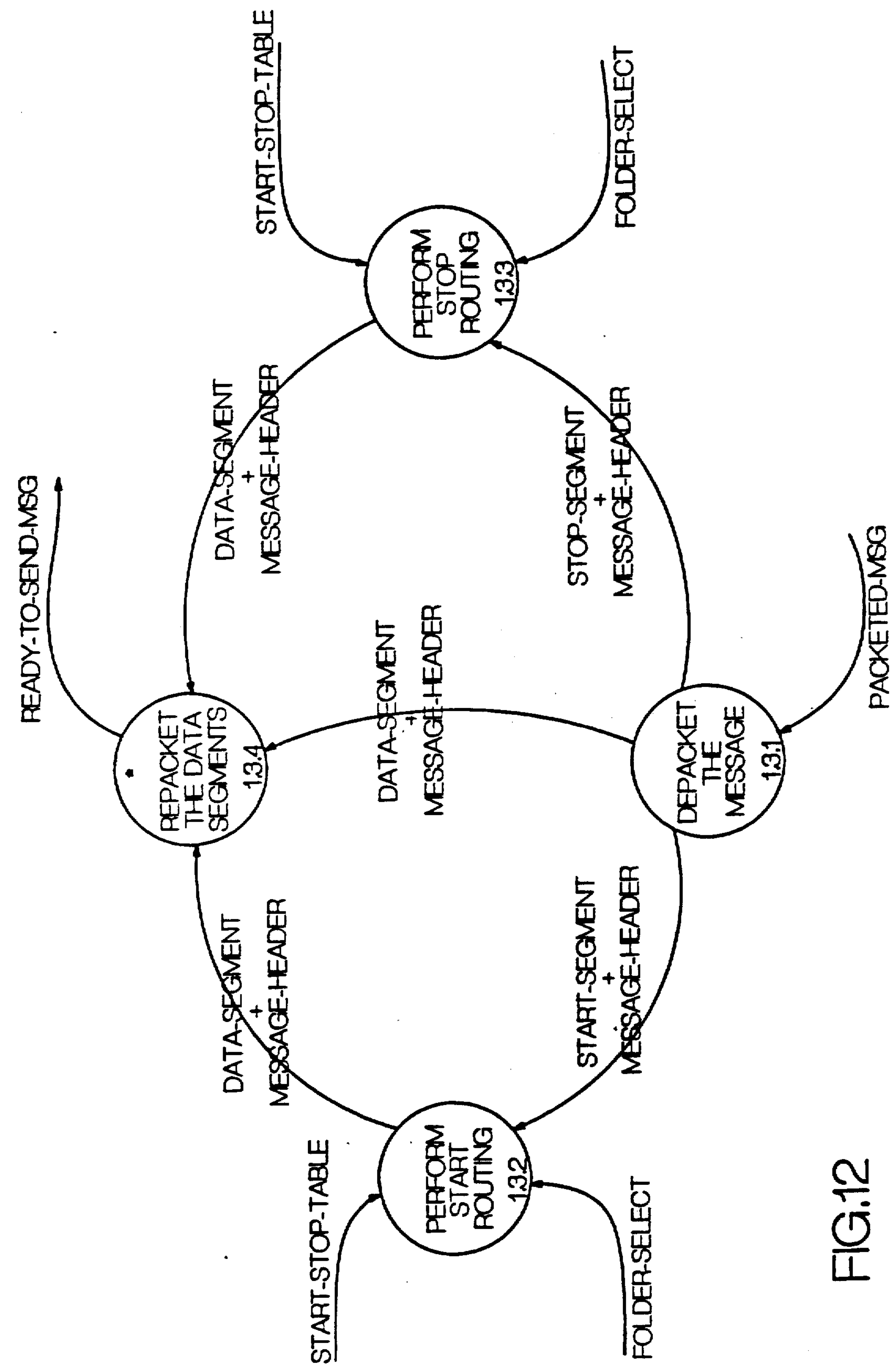
Figure 13:
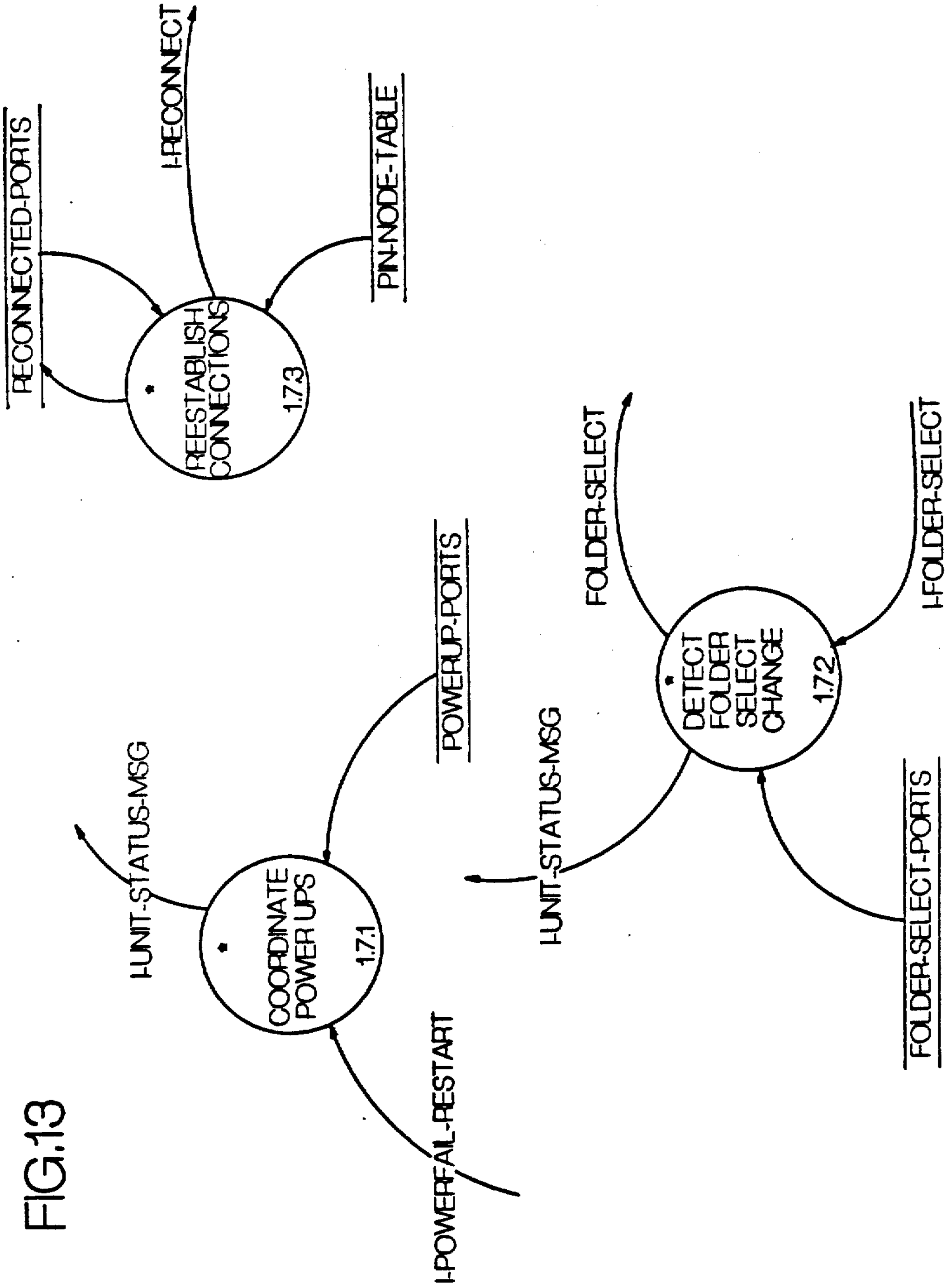
Figure 15:
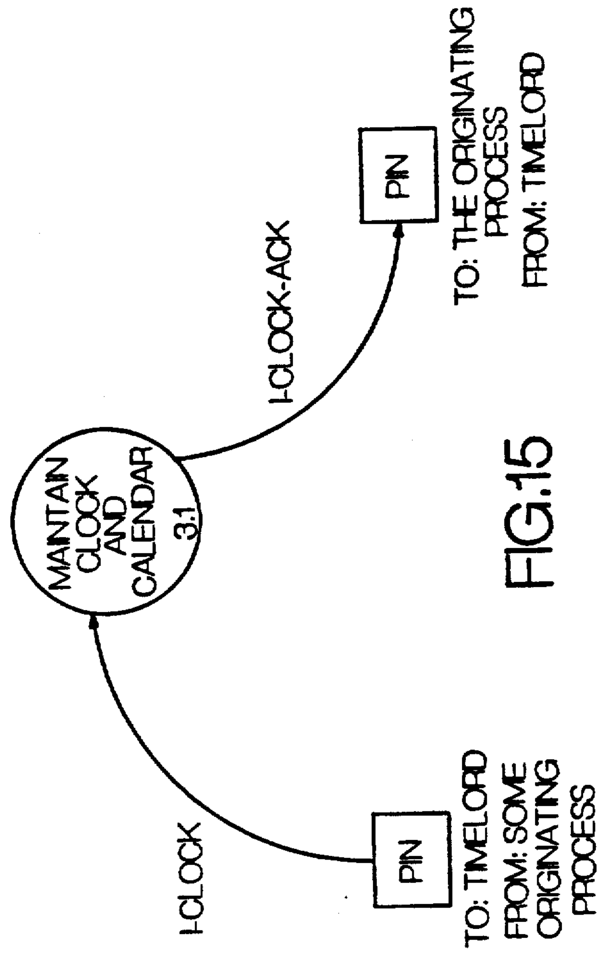
Figure 14:
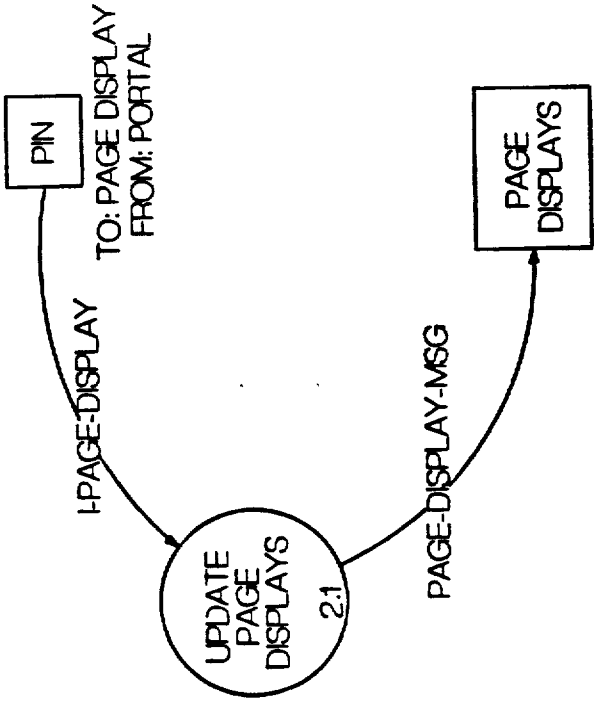
Figure 16:
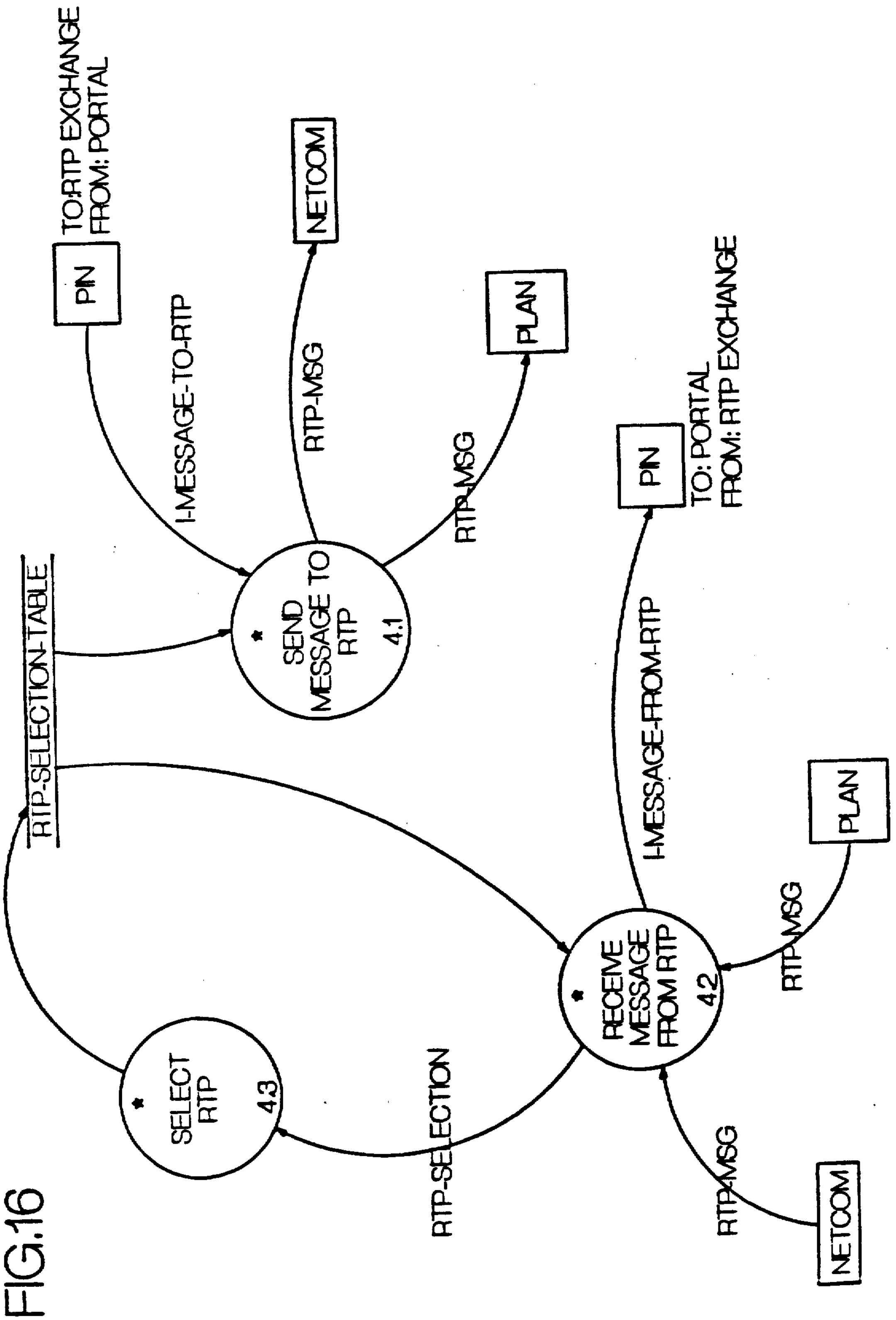
Figure 17:
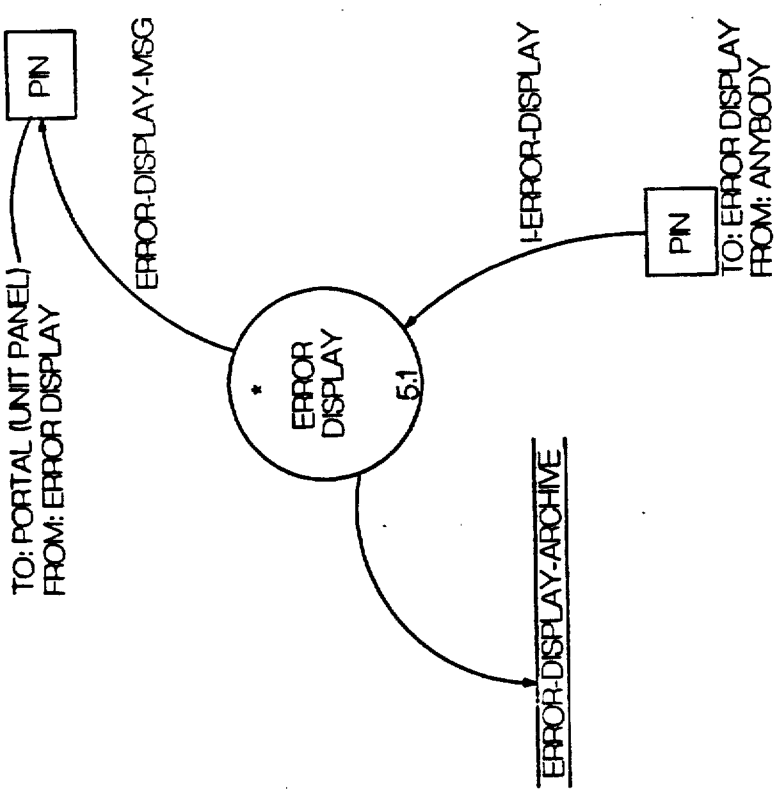
Figure 18:
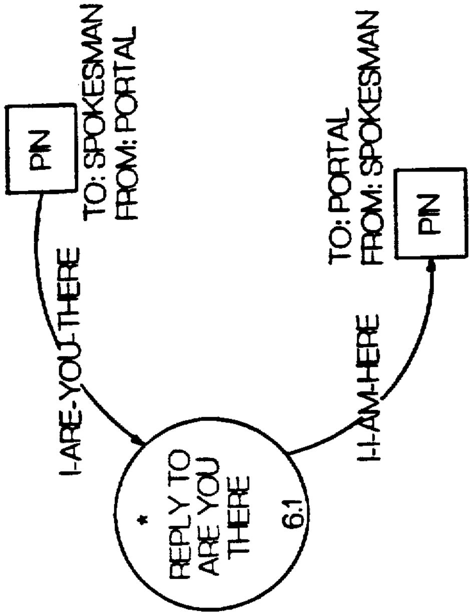
Figure 19:
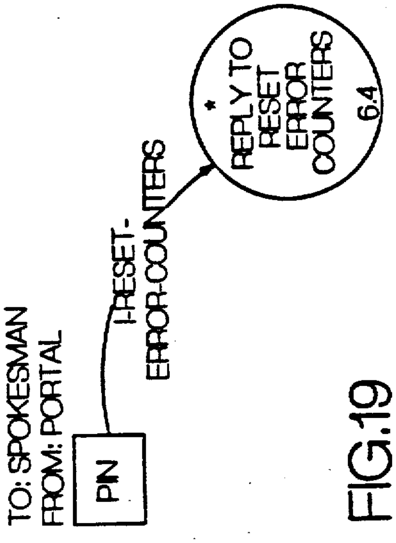
Figure 20:
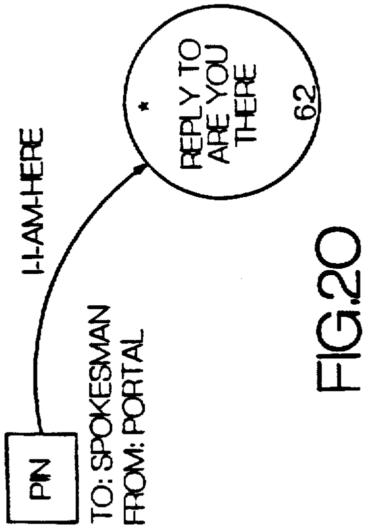
Figure 21:
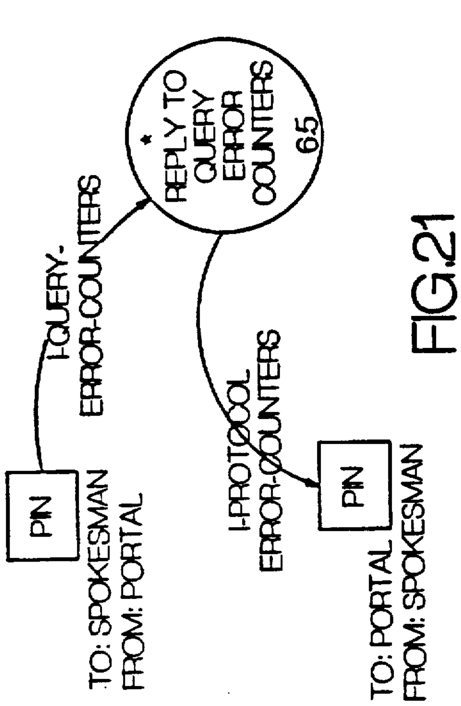
Figure 22:
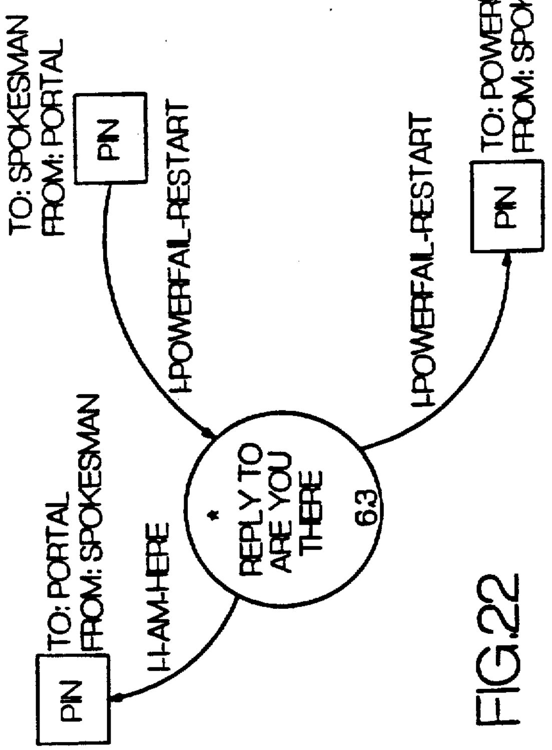
Figure 23:
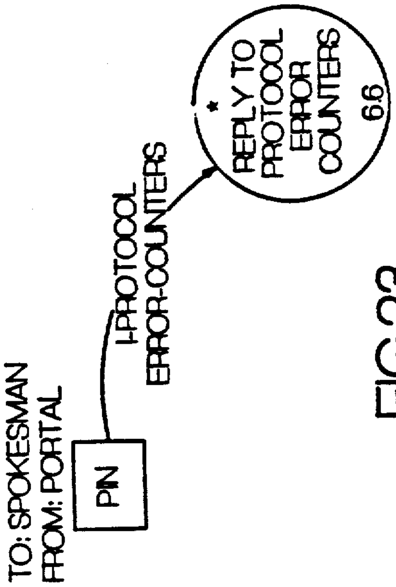
Figure 24:
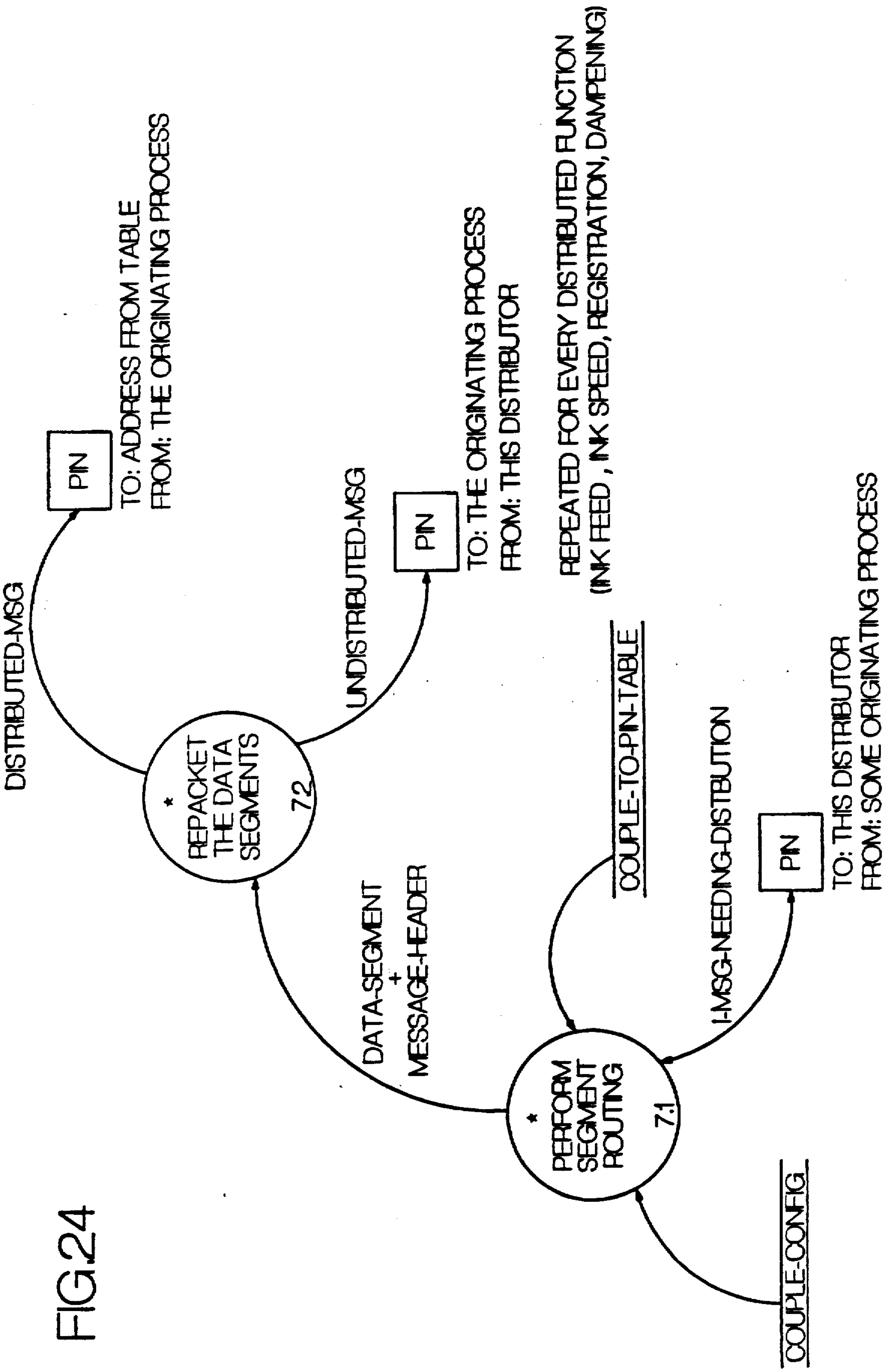

Referring now to FIG. 7, the COMM design must meet the following general requirements:

- it must be easily ported to other products that have similar functional requirements (such as the folder controller);
- as much of the code as possible must be written in a high-level language;
- the design and development of the COMM software should seek to be as device independent as possible; and
- design documentation, both within the code and without, must accurately reflect the desired implementation.

COMM is responsible for the following unit controller functions:

- all of the control consoles will communicate with the unit controller via COMM;
- the following control console ports will be supported:
  - the virtual PLAN ports (via a single physical port);
  - unit panel; and
  - right and left MPCS press consoles.

COMM will deliver control console messages to the appropriate component processors. It is desirable, but not necessary, that the message-to-component-processor correspondence be established at run-time. This approach provides maximum flexibility.

COMM will deliver outgoing component processor messages to the appropriate control consoles.

COMM will replicate outgoing messages as needed to achieve proper "start" and "stop" message routing. The component processors need only send the message once.

COMM will perform whatever power-up message dialogue is required with the various control consoles.

COMM will control the unti page displays.

COMM will support an error logging port.

There will be an "offline" diagnostios mode that can assist during production testing, installation, and maintenance.

COMM will handle the response to the following control console messages. These messages invoke unit-wide functions that are not related to device control.

ARE YOU THERE?
I AM HERE
POWERFAIL RESTART
QUERY PROTOCOL ERROR COUNTERS
RESET PROTOCOL ERROR COUNTERS
PROTOCOL ERROR COUNTERS

COMM will handle the front-end processing for the following control console messages. These messages invoke functions that apply to more than one component processor.

MODULE STATUS

When the RTP's are accessible via PLAN, COMM will route messages between the unit panel and the RTP's.

When the RTP direct-connected, COMM will route messages between the control consoles and the RTP.

Accesses to nonvolatile memory shall be controlled such that erroneous or missing data will be recognized.

Nonvolatile memory will be structured so that software updates will not necessarily invalidate the content of the previous version's nonvolatile memory.

COMM will communicate with the PLAN via a 19.2 Kbaud serial link.

COMM will communicate with the unit panel and MPCS press consoles via point-to-point NETCOM links. COMM will be the NETCOM master for each of these links. Communication will be at 9600 baud.

COMM will communicate with the other component processors via point-to-point NETCOM links. COMM will be the NETCOM master for each of these links. Communications will be at 9600 baud.

COMM will communicate with the unit page displays via a 1200 baud multi-drop serial link.

The component processors will notify COMM of the control console messages that they desire. This notification must take place when the component processors power up; and whenever COMM powers up.

The unit controller need only notify the following control consoles that it has powered up:

all APCS master work stations (right and left);
MPCS press consoles (right and left); and
unit panel.

The PLAN driver is able to report the virtual port number of the unit controller.

The PLAN driver provides access to three bridged LAN's (corresponding to adjacent presses): left, right, and local.

Configuration inputs ar available to COMM that specify whether or not anything is connected to the PLAN, right MPCS, and left MPCS ports respectively;

Configuration inputs are available to COMM that specify whether the RTP is connected as a component processor or through the PLAN;

Configuration inputs are available to COMM that indicate whether the unit can be connected to the right or left folder respectively;

Configuration inputs are available to COMM that indicate which folder (right or left) resides on the local LAN;

Configuration inputs are available to COMM that specify whether the baud rate of the error logging port is high or low;

The baud rate for the component processor ports will be hard-coded into the software.

The baud rates for the control consoles ports will be hard-coded into the software.

The baud rate for the page display port will be hard-coded into the software.

Couple configuration (which couples exist) will be known by the monitor-and-control component processor. This information will be available to COMM upon request. Until it hears otherwise, COMM will assume that all 8 couples exist.

Folder selection will be known by the monitor-and-control component processor. This information will be available to COMM upon demand, and spontaneously whenever it changes, via PIN message.

Message traffic with the RTP's (when they reside on the PLAN) will be limited to messages to and from the unit panel.

There will be 64 page displays (eight couples' worth). However, they will all share the same multi-drop serial line.

No more than 2 RTP's can be controlled by the unit panel at one time.

The communications processor forms a bridge between two quite different kinds of devices: the external control consoles and the internal component processors.

Each of the control consoles communicates with COMM via one of two distinct interfaces: the PLAN or point-to-point NETCOM. The design of the communications processor will insure that no other component processor need be aware of this distinction. Separate specifications exist to define the communications interface between COMM and the control consoles. (See Appendix B)

All of the component processors are linked by PIN. Application programs can send messages to logical tasks without regard for how functions are partitioned between processors. A separate specification exists to fully define PIN. (See Appendix A)

Each message received from a control console is forwarded to the PIN channel of the appropriate unit controller task. This is accomplished through a look-up table that relates message number to PIN channel. Messages that cannot be forwarded (no table entry for the message number or PIN transmission error) are rejected with status ="function not available." The look-up table will be built at run-time so that COMM can easily accommodate new unit controller messages and functions. The messages received by the component processors will be tagged with the name of the "originating" control console.

In some cases, individual data segments of a message will have to be routed to different component processors. COMM is responsible for providing this service.

COMM will accept component processor messages that are intended for the control consoles. The component processors are required to specify the "originating" control console. If the message is spontaneous (not a response to a control console message), i.e. manual change, then the originator should be set to a special value that means "internal" originator.

COMM breaks each message into its constituent data segments. The segment status field of each data segment is analyzed to determine which of the following categories the segment belongs to:

change start notification;

change stop notification, AND change start message was sent at beginning of change;

change stop notification, AND no change start message was sent; this case is treated the same as . . .

everything else.

In some cases, the data segment will be sent to several consoles. Should that be necessary, COMM will replicate the data segment. If the routing algorithm determines that the segment should not be sent to any control console, an error will be logged and the segment will be discarded. The following segment routing algorithms are supported:

Change start notification, route the data segment to all of the control consoles that have enabled start notification for that message number except the originator; start messages are never sent to the originating control console; spontaneous messages (i.e., manual change) do not have an originator.

Change stop notification (if the start of the change was announced); route the data segment to all of the control consoles that have enabled stop notification for that message number; send the data segment tot he originator even if that control console has not enabled stop notification. Stop messages are always sent to the originating control console; spontaneous messages (i.e., manual change) do not have an originator.

Everything else; route the message to the originating control console; spontaneous messages (i.e., manual change) do not have an originator; in that case the message will be discarded.

If PIN cannot send such a message to the communications processor, then it builds and maintains a MESSAGES LOST message. When COMM finally receives the MESSAGES LOST message, it forwards copies of it to all of the control consoles that require a power-up message exchange. If COMM is unable to send messages to a control console, it builds and maintains a MESSAGES LOST message that is only routed to that specific control console.

There are two special cases:

INFORMATIONAL STRING and FAULT STRING messages from the remote consoles are sent to the unit panel. If COMM is unable to forward either of these messages, it discards the messag without notifying the control consoles.

WEB TENSION messages are transferred from the unti panel to the RTP's (and vice-a-versa). This is only true when the RTP's reside on the PLAN. IF COMM is unable to transfer a message from the unti panel to an RTP, it rejects the message with status "function not available". If COMM cannot forward a message from an RTP to the unit panel, then it builds and maintains a MESSAGES LOST message for the unit panel.

Page displays will be provided to specify where each plate mounts on the printing couples. Two plates will be mounted at each plate position (one "high" and the other "low"); hence, there will be 8 page displays per couple. The page display will be linked to COMM by a single-sender/multiple-listener multi-drop serial cable. Incoming PAGE DISPLAY messages from the control consoles will be routed to page display serial link. It is the responsibility of the control console to format the message for proper reception.

COMM provides the following miscellaneous unit controller functions:

Distribute MODULE STATUS query messages to the various component processors.

Respond to the following control console messages:

ARE YOU THERE?
I AM HERE
POWERFAIL RESTART
QUERY PROTOCOL ERROR COUNTERS
RESET PROTOCOL ERROR COUNTERS
PROTOCOL ERROR COUNTERS

Initiate a power-up message exchange with the appropriate control consoles whenever any of the component processors power-up.

Initiate a power-up message exchange with the appropriate control consoles whenever the unit panel powers-up.

Maintain the official time-of-day clock for the unit controller. This clock will be available to the component processors. The clock will be maintained in software, so no special hardware is required. Users of the time-of-day clock should not expect accuracy better than a minute or two (due mainly to message delays).

Collet error-display messages from the component processors and forward them to the unit panel in the form of INFORMATIONAL STRING or FAULT STRING messages.

Exceptional events and conditions will be recorded through the error logging utility. Error logging will not be effective unless a terminal is connected to the logging port. A separate specification exists to fully define the error logging utility. Refer to the list of applicable documents.

A diagnostics package is included in the COMM software. Diagnostic operation and normal operation are mutually exclusive. Diagnostics can be entered in two ways: either through a switch setting in the communications processor or via a PIN message from another component processor. If one component processor enters diagnostics, the entire unit must enter diagnostics.

The functional requirements for COMM diagnostics can, for example, include:

perform loop back tests on any serial port;

perform memory tests (on ROM and RAM);

display the state of the COMM configuration inputs;

display (and modify?) memory by absolute address;

display (and modify?) major databases symbolically;

display the most recent N error log messages;

display the most recent N messages sent to the error-display on the unit panel;

format and send messages to the control consoles;

format and send messages to the component processors;

format and send messages to the page displays;

set the official time-of-day clock;

Access to the pROBE debugger.

The unit controller communications processor is implemented within a VME-bus chassis containing the following components:

1. One Omnibyte single board computer; part number OB68K/VME1. This is a 6 U (double height) card.
2. Two SBE 8-channel intelligent serial interface boards: part number VCOM-1. These are 6 U (double height) cards.

The COMM hardware supports 16 bits of digital I/O via ports A and B of the 68230 on the Omnibyte SBC. the I/O signals are assigned as shown in FIG. 8.

The COMM hardware supports 18 serial ports, divided among all three boards. The serial ports are assigned as follows:

Each SBE board has two front-panel LED indicators:

HALT: This indicator reflects the state of the HALT pin of the MPU chip. The LED is illuminated when HALT is active.

RUN: This indicator is illuminated whenever the HALT LED is inactive. That is, it is illuminated while the MPU is running.

The software has been partitioned into tasks. In general, the tasks only interact through PIN; which is outside the context of this design. The tasks are described below:

1. GATEWAY

This task provides a gateway between the component processors and the control consoles. Gateway is responsible for transferring messages between those two types of devices.

2. PAGE DISPLAY

This task stores the plate names and updates the page displays as needed.

3. TIMELORD

This task maintains the "official" unit controller clock/-calendar. Any component processor may query timelord for the correct date and time.

4. RTP MESSAGE EXCHANGE

This task passes web tension messages between the unit panel and the appropriate RTP's. This task is only active when the RTP's reside on the PLAN.

5. ERROR DISPLAY

This task forwards all error display messages to the unit panel. The error display messages are archived for later retrieval by the diagnostics task.

6. SPOKESMAN

This task responds to ARE YOU THERE, POWER-FAIL RESTART, and I AM HERE messages from the control consoles.

7. DISTRIBUTOR TASKS

These tasks break-up certain control console messages into individual data segments and then send the data segments to the appropriate component processors. The distributor tasks deal with messages that define functions that are distributed among several component processors.

8. DIAGNOSTICS

This task supervises diagnostics. It has not yet been defined.

Data flow diagrams are depicted in FIGS. 10 through 24.

PIN addresses are specified [in italics]on those data flows that signify reception or transmission of messages via PIN.

Appendix A contains a more specific descriptive description of the present invention. Appendices B and C set forth definition of terms.

The development of software for the microprocessor 42 can be performed in numerous different ways by one skilled in the art. One software embodiment for controlling the spray bar assembly 26 is disclosed in U.S. Ser. No. 191,621 filed May 9, 1988, now U.S. Pat. No. 4,899,653 (hereby incorporated by reference). The control of inking as well as other functions can be accomplished with a similar software program.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

APPENDIX A

1. INTRODUCTION

This document describes the capabilities and interface for the Processor Interconnect Network (PIN).

The PIN software, which runs under pSOS, is the highest network layer. It makes calls to the NETCOM software below it, which serves as the data link layer. The NETCOM software communicates with the serial device drivers, which are considered the physical layer. The following diagram shows these layers as they relate to the International Standards Organization (ISO) model:

| Application code | |
|---|---|
| PIN | Network layer |
| NETCOM interface | Data link layer |
| Serial device drivers | Physical layer |
| Serial ports (hardware) | Physical medium |

Although the unit controller network has point-to-point wiring, the PIN allows interprocess communications without regard for how the nodes are physically connected.

2. DESIGN GOALS

The PIN network design goals are:

1. Permit message traffic between any nodes
2. Eliminate fixed assignment of UART ports to function processors
3. Allow messages to be sent without regard for functional partitioning between nodes (inferred addressing)
4. Keep the software as common as possible for all processors
5. Network may be expanded without having to preserve the star architecture.

By eliminating fixed port assignments, the cables from each function processor can be plugged into any of the PIN serial ports on the communications processor. If a PIN port on the communications processor fails, the problem can be circumvented by simply moving to a spare port and restarting the unit controller.

3. THE FUNCTION OF THE NETWORK LAYER

The fundamental goal of the NETWORK layer is to permit a process to send a message to another process regardless of where the destination resides (no concern for the physical network configuration). Once a NETWORK layer address has been opened, any process on any of the function processors can send it a message.

Network layer addressing allows each unit controller function to have a unique address. Dampening, registration and ink roller speed can have individual addresses even though they reside on the same processor. This could eliminate the need for an application-level message routing process on each function processor.

The link between an address and the function processor which the address is on is built during run time. Addresses can be added, deleted or moved between processors without changing the network software. Depending on where the desitnation address was opened, messages may be sent to other function processors or to another process on the same processor. If the destination address does not exist (is not open), the transmit function returns with an error code.

4. TYPES OF MESSAGE ADDRESSING

Parts of the NETCOM header are used by the network for source and destination addresses. The first three bits of the NETCOM source/destination are used by the network as an address qualifier; they define an addressing mode. The section identifier field of the NETCOM header is used by the network to hold a physical node address (0-31). Address zero is special. It represents the current node (to be described later). The "Unit number" field is interpreted by the network as a channel number (a logical ID). Channel number zero is reserved for the network software.

The network layer software provides three types of message addressing: "class" addressing, inferred addressing, and explicit addressing. The address qualifier is used to define the addressing mode. The following table shows the values for each mode:

| QUALIFIER | MODE |
|---|---|
| 000 | Class 0 |
| 001 | Class 1 |
| 010 | Class 2 |
| 011 | Class 3 |
| 100 | Reserved |
| 101 | Reserved |
| 110 | Inferred Addressing |
| 111 | Explicit Addressing |

In class addressing, the qualifier field fully specifies the desired address—the node and channel fields are unused and unchanged. Class messages are desirable when a message must be transferred wihtout disturbing the NETCOM section identifier or unit number fields. The network layer software supports up to four different classes.

With inferred addressing, the channel is specified but not the node. This mode is used when a channel value has been opened only once across the entire network. The network software determines which node opened the address and routes the message to that node. The advantage of inferred addressing is that the sender does not have to known which physical node opened the destination address; thus it need not be aware of the functional partitioning.

In explicit addressing both the node and the channel are specified when addressing messages. Messages to be transmitted must specify the node and the channel. This mode is used when a single channel value may be open on two or more nodes.

5. APPLICATION INTERFACE

The application calls subroutines in the network layer to perform such functions as initialization, send and receive. The subroutines defined by the network layer are:

P_INIT—Initialize the network layer software
P_OPEN—Open a network layer channel or class
P_CLOSE—Close a channel or class
P_SEND—Send a message
P_RECV—Receive a message The initialization and open subroutines require a character string as one of the arguments from the application. These names are used when printing network status (diagnostics) and have nothing to do with message transmission or routing. See the attached users manual pages for a complete description of each function.

5.1 INITIALIZATION

The P_INIT function is called to initialize the network layer. The P_INIT function must be given a list of all of the ports which are used, the node number, and a string which contains the name of the node, and other network parameters.

Each node must have a different node number, which is a value from 1 to 31. The user is responsibel for insuring unique node numbers. P_INIT cannot guard against two or more nodes using a common node number.

5.2 OPENING OR CLOSING AN ADDRESS

An application process opens a network layer address to proclaim itself the receiver of messages.

The P_OPEN function is called to open a channel or a class. In addition to the address to be opened, it is also passed a string which contains a name to be associated with the address. This name is used for diagnostic purposes only.

A network layer address is closed by calling the P_CLOSE function. These functions return zero for success or nonzero for failure. The return values are listed in the attached manual pages and are also defined in the header file "pin.fun".

5.3 SENDING A MESSAGE

Any process may send a message. A process does not have to have an address open to send a message. However, the source address must be a network address that is open on the current node.

The message to be setn must be stored in a buffer. The application sofrtware sends messages by calling the P_SEND subroutine with a pointer to the message as an argument. If the message is to leave the node, the P_SEND function will free the buffer by calling the application-supplied "FREE" function when transmission has completed. If the message is routed to a channel on the same node, the receiving process must free the message buffer. The sending process does not free the buffer unless there was a transmission error.

The function returns a zero value once the message has been transferred to another process on the same node, or once it has successfully left the node. In situations where the message must leave the node a zero return value indicates error-free transmission to the neighboring node. This should not be mistaken for successful transmission to the final destination for the message may have to travel through one or more in-between nodes. Nonzero return values indicate various errors as described in the P_SEND manual page.

5.4 RECEIVING A MESSAGE

The application must call the P_RECV function to request a message from the network layer software. The address for which the application wishes to receive the message must be specified when calling the subroutine. The attached manual page for P_RECV describes the address argument in more detail. The return value is a pointer to the buffer containing message size and message data. The application must release the message buffer when it has finished with it. The P_RECV function is passed the address of a status variable which it sets before returning. The P_RECV manual page lists the various status values and their meaning.

The network layer software queues up incoming messages. If there is a received message waiting in the queue, the function returns immediately with a pointer to the message. The calling process passes a wait flag and time-out value which are used if there are no messages available. This allows it to determine whetehr to wait for a message and, if so, for how long.

6. TRANSMISSION ERROR HANDLING

When a NETCOM transmission error occurs, the network software will retry continually until the message gets out successfully. The application can change this by providing its own error handling function.

The network software calls the NETCOM N_SEND function to send a message. The return value from N_SEND indicates the success or failure of the operation. (See the N_SEND manual page). If the application specifies a recovery function when initializing the network, the network software will call the application-supplied function instead of N_SEND whenever there is a message to be sent. That application function then has the responsibility of calling the N_SEND function and repsonding to the error status.

7. NETWORK CONTROL MESSAGES

Messages are defined for communications between the application and the network software. The application addresses messages to the network software by using explicit addressing and channel zero. The message will be delivered to the network software on the current node if the node number is zero. Messages may be sent to the network software on other nodes by specifying the desired node number along with channel zero. Currently only the "Are you there" message can be sent by the application to the network software. The network responds by sending the "I am here" message back to the application.

```
char *p_init();
char *status;
status=p_init(pcnt, ports, recovery, getbuf, frebuf,
    err_log, phy_name, phy_addr, grid, priority);
```

| ARGUMENTS | |
|---|---|
| short pcnt; | /* The number of serial ports */ |
| unsigned short ports[ ]; | /* List of serial ports (major/minor No.'s) */ |
| int (*recovery)( ); | /* A pointer to the error recovery function */ |
| char *(*getbuf)( ); | /* Pointer to buffer allocation function */ |
| int(*frebuf)( ); | * Pointer to buffer release function */ |
| int max_chan; | * The maximum number of PIN channels */ |
| char phy_name[ ]; | /* A string with the name of the node */ |
| char phy_addr; | /* The node physical address */ |
| char grid; | /* Process Group ID */ |
| char priority; | /* Process priority */ |

DESCRIPTION

This function initializes the network layer of the Processor Interconnect Network (PIN). The serial ports to be used must be open for NETCOM communication before calling this function (opened by calling the N_OPEN function).

The recovery parameter may have a NULL (zero) value. A NULL value indicates that the recovery function does not exist. The manual page titled "recovery" describes the interface which the recovery function must conform to. See the PIN Functional Specification for a complete description of the recovery function.

The grid and priority parameters set the group-ID and priority of all pSOS processes spawned by the network software.

The return value is NULL for success; non-null for failure. If the initialization fails, the return value is a character pointer to an error message describing the problem. This function may be called only once. Successive calls will return an error value.

SEE ALSO

COMPARING P.I.N. NETWORK TO OSI REFERENCE MODEL

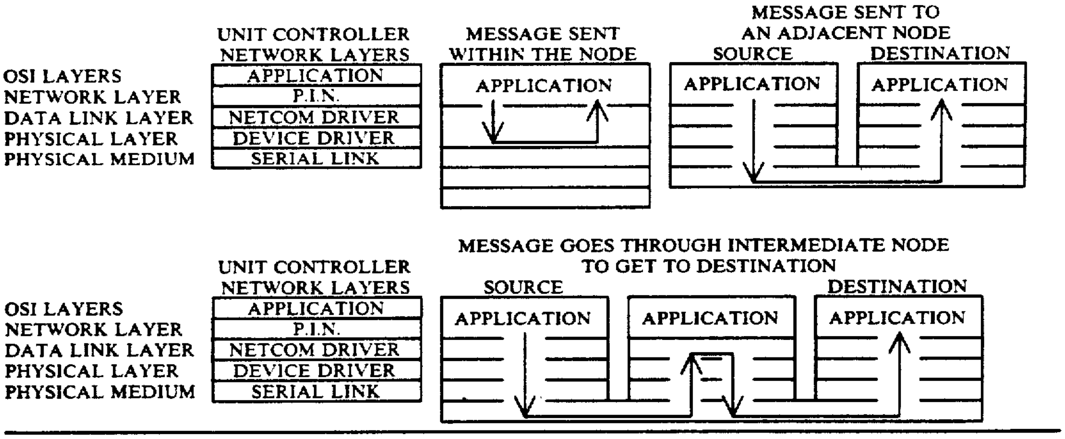

| P—INIT | PIN | P_INIT |
|---|---|---|

ABSTRACT

Initialize the PIN layer software.

SYNOPSIS

```
# include "pin.h"
# include "pin.fun"
```

recovery—Black box interface for the recovery function

P_OPEN—Open a network layer channel.

P_CLOSE—Close a channel.

P_SEND—Send a network layer message.

P_RECV—Get a received network layer message.

| recovery | PIN | recovery |
|---|---|---|

ABSTRACT
Overview of an error handling function.
SYNOPSIS
# include "pin.h"0
# include "netdll.h"
int recovery();
int status;
status=recovery( buffer, port); /* Called by P.I.N. */

| ARGUMENTS | |
|---|---|
| char *buffer; | /* Pointer to the message buffer */ |
| short port; | /* Major/minor number of output port */ |

DESCRIPTION
This manual page describes the interface for the error handling function, which the application must provide if it desires special error handling. The error handling functino provided by he application is integrated into the network by passing its address when calling P_INIT.

The PIN transmit process normally calls the function N_SEND to send each NETCOM message. The application-supplied function, if passed to L_INIT, is called by the PIN transmit process in place of N_SEND. Thus, the arguments to the error handling function and the value it returns are identical to N_SEND.

The application function is expected to call N_SEND to send the message passed to it. The user, by supplying the error handling function, decides what to be done should N_SEND return an error.

The error handling function must use the same return values as the PIN transmit process (see the N_SEND return values). If it returns N_TOOMANY or N_ISIOERR, the transmit process will retry transmission by calling it again with the same message.

| P_OPEN | PIN | P_OPEN |
|---|---|---|

ABSTRACT
Open a network layer address.
SYNOPSIS
# include "pin.h"
# include "pin.fun"
int status;
status=p_open (name, address);

| ARGUMENTS | |
|---|---|
| char name[ ]; | /* A string containing the name associated with the address */ |
| short address; | /* Channel (1-255) */ |

DESCRIPTION
The specified network layer address is opened on the current node. The "name" argument is used for diagnostic purposes only. It has no effect on message routing.

The possible return values are as follows:
P_SUCCESS—The open operation was successful.
P_NOTINIT—The network has not been initialized.
P_BADVALUE—The channel value is out of range.
P_AROPEN—The channel is alreay open on the current node.
P_PSOSERR—The pSOS resource could not be obtained.
P_INTERNAL—A PIN data table is corrupt.

Message sent will be routed to the node which opened the address. The P_RECV function must be called to transfer received messages from the network layer to the application.

SEE ALSO
P_INIT—Initialize the network layer.
P_CLOSE—Close an channel.
P_SEND—Send a network layer message.
P_RECV—Get a received network layer message.

| P_CLOSE | PIN | P_CLOSE |
|---|---|---|

ABSTRACT
Close a network layer channel.
SYNOPSIS
# include "pin.h"
# include "pin.fun"
init status;
status=p_close (address);

| ARGUMENTS | |
|---|---|
| short address; | /* Channel to be closed (1-255) */ |

DESCRIPTION
The specified network layer address is closed. The address must have been opened by the current node. A process cannot close an address which was opened on some other node. The return value is as follows:
P_SUCCESS—The address was successfully closed.
P_NOTOPEN—The address it not open.
P_BADVALUE—The address is illogical.
P_PSOSERR—Error in allocating a pSOS resource.
P_INTERNAL—PIN processes/tables are corrupted.
P_NOTINIT—The PIN is not initialized.

SEE ALSO
P_INIT—Initialize the network layer.
P_OPEN—Open a network layer channel.
P_SEND—Send a network layer message.
P_RECV—Get a received network layer message.

| P_SEND | PIN | P_SEND |
|---|---|---|

ABSTRACT
Send a message using the network layer network software.
SYNOPSIS
# include "pin.h"
# include "pin.fun"
int status;
status=p_send( bptr, from, to);

| ARGUMENTS | |
|---|---|
| char *bptr; | /* Pointer to the message buffer */ |
| short from, to; | /* Source and destination addresses */ |

DESCRIPTION

The supplied NETCOM message is sent to another destination via the network layer. The buffer supplied by the application must contain the message size (two bytes) and a complete NETCOM header (6 bytes). The message size is a value from 6 to 255, and represents the NETCOM header plus the message body. The message data follows the NETCOM header in the buffer. The message buffer is freed by P_SEND when transmission is successful.

The network software parses the destination address to determine where to send the message. The message qualifier determines how the remainder of the address will be interpreted. The header file, "pin.h", has definitions for the various addressing modes. If the qualifier value is PIN_CLASS0, PIN_CLASS1, PIN_CLASS2 or PIN_CLASS3; the address is one of the foure classes (0, 1, 2, or 3) and will be sent to the node which opened the stated class.

If inferred addressing is used (address qualifier=INFERRED), the address specifies a channel and the network will determine which node opened the channel and sent the message to that node. The P_SEND function will return with an error code if the channel is not open, or if it is open on more than one node.

Explicit addressing (address qualifier=EXPLICIT+node number) requires the user to specify both the node number and the channel. The message will be sent to the open channel on the specified node.

The P_SEND return value is as follows:

P_SUCCESS—Message has left the node.
P_NOTOPEN—Class or channel not open.
P_BADVALUE—Invalid address
P_BADMSG—Message size is incorrect (less than 6 or greater than 258).
P_PSOSERR—Error in acquiring a pSOS resource.
P_NOTINIT—The PIN has not been initialized.
P_INTERNAL—The PIN tables or processes are corrupt.

The message buffer is unchanged whenever an error occurs.

SEE ALSO

P_INIT—Initialize the network layer.
P_OPEN—Open a network layer channel.
P_CLOSE—Close a channel.
P_RECV—Get a received network layer message.

| P_RECV | PIN | P_RECV |
|---|---|---|

ABSTRACT

Get a received message from the network layer.

SYNOPSIS

```
# include "pin.h"
# include "pin.fun"
char *bptr;
char *p_recv();
bptr=p_recv(address, wait, time-out, &source, &status);
```

| ARGUMENTS | |
|---|---|
| short address; | /* PIN address */ |
| char wait; | /* 0=wait if necessary. <0 unconditional return */ |
| long timeout; | /* Clock ticks to wait until time-out */ |
| short source; | /* Address of the message source */ |

-continued

| ARGUMENTS | |
|---|---|
| int status; | /* Status returned by P_RECV */ |

DESCRIPTION

This function returns the next message received for the specified address. Should there be no messages and the wait and time-out values are zero, the calling process will be blocked until a message arrives. If the wait argument is nonzero, the time-out value sets the maximum number of clock ticks to wait for a message.

The address argument may be a "class" or a channel. Classes are one of the values PIN_CLASS0, PIN_CLASS1, PIN_CLASS2, or PIN_CLASS3. Channel addresses are the channel value OR'ed with INFERRED or EXPLICIT.

The return value is a pointer to the buffer containing the message. The size of the message will be stored in the first two bytes of the message buffer, followed by the NETCOM header and the message data. The message size is a value ranging from 6 to 255, representing the NETCOM header plus the message body. The application has the responsibility of freeing the buffer space when it is finished.

The "source" parameter will contain the network source address of the message upon successful return. The pointer returned will be NULL if a message was not available or there was an error. The P_RECV function stores a value in the satatus parameter to describe the malfunction. The possible status values are as follows:

P_SUCCESS—No errors. Message returned.
P_TIMEOUT—Timed out waiting for a message.
P_NOTOPEN—Improper address or address not open.
P_PSOSERR—Could not get a pSOS resource.
P_INTERNAL—PIN internal error.
P_BADVALUE—Invalid PIN address.

SEE ALSO

P_INIT—Initialize the network layer.
P_OPEN—Open a network layer channel.
P_CLOSE—Close a channel.
P_SEND—Send a network layer message.

The following PIN addresses are defined for the communications processor:

Dampener Distributor. DAMPENER messages from the control consoles are sent to this address. The messages are then depacketed; each data segment is individually sent to the PIN address of the appropriate component processor. In addition, forwarded START/STOP CONTROL and MODULE STATUS messages will also be sent to this address.

Error Display. FAULT STRING and INFORMATIONAL STRING messages from the consoles and component processors are sent to this address. The messages are then forwarded to the unit panel, where they are displayed for the operator.

Keyhole. CONNECT messages from the component processors are sent to this address.

Ink Feed Distributor. INK FEED messages from the control consoles are sent to this address. The messages are then depacketed; each data segment is individually sent to the PIN address of the appropriate component processor. In addition, forwarded START/STOP CONTROL and MODULE STATUS messages will also be sent to this address.

Ink Speed Distributor. INK SPEED messages from the control consoles are sent to this address. The messages are then depacketed; each data segment is individually sent to the PIN address of the appropriate component processor. In addition, forwarded START/STOP CONTROL and MODULE STATUS messages will also be sent to this address.

Module Status Router. MODULE STATUS messages from the control consoles are sent to this address. The messages are then depacketed; each data segment is individually forwarded to the PIN address of the appropriate component processor.

Page Display. PAGE DISPLAY messages from the control consoles are sent to this address. The messages are relayed to the page display hardware.

Portal. Message from the control consoles are sent from this address. In addition, any component processor message intended for a control console must be sent to this address.

Power-up Manager. Powerup messages from the component processors should be sent to this address. They will be relayed to the appropriate control consoles.

Registration Distributor. CIRCUMFERENTIAL REGISTRATION and SIDELAY REGISTRATION messages from the control consoles are sent to this address. The messages are then depacketed; each data segment is individually sent to the PIN address of the appropriate component processor. In addition, forwarded START/STOP CONTROL and MODULE STATUS messages will also be sent to this address.

RTP Exchange. Control console messages intended for the RTPs are sent to this address. In addition, all RTP messages are sent from this address.

Spokesman. The following control console messages are sent to this address. The response messages are sent from this address.

ARE YOU THERE
I AM HERE
POWERFAIL RESTART
QUERY PROTOCOL ERROR COUNTERS
RESET PROTOCOL ERROR COUNTERS
PROTOCOL ERROR COUNTERS

Start/Stop Controller. START/STOP CONTROL messages from the control consoles are sent to this address. The individual data segments of the messages are used to maintain the START-STOP-TABLE. When necessary, a START/STOP CONTROL message is forwarded to the appropriate component processor.

Timelord. CLOCK/CALENDAR messages from the control consoles and component processors are sent to this address. Response messages are sent from this address.

APPENDIX C

COMM - An abbreviation for "communications processor". This is one of the various component processors within the unit controller.

COMPONENT PROCESSOR - This term is used to specify one of the distributed processors within the unit controller.

CONTROL CONSOLE - A terminal from which an operator can alter or monitor any of the press settings.

PIN - An acronym for "processor interconnect network". This is the name given to the communications network that links the various component processor within the unit controller.

PLAN - An acronym that means: Press Local Area Network. This is the name of the LAN used by the APCS system.

pROBE - A debugger for 68000 family systems supplied by Software Components Group, Inc. The reader is assumed to be familiar with pROBE.

pSOS - A multi-tasking operating system for the 68000 processor family supplied by Software Components Group, Inc. The reader is assumed to be familiar with pSOS terms and concepts.

Remote console - Any control console other than the unit panel.

Task - the software necessary to implement a single function. It may consist of any number of the following entities:

processes
message exchanges
miscellaneous data stores
interrupt service routines
subroutine libraries
header files The programs which direct the operation of the microprocessor 42 and, hence, control the operation of the drink processor 35 are stored in the ROM 44. These programs include a set of programs which carry out specific tasks or processes as well as a real time clock interrupt service routine and an operating system program.

What is claimed is:

1. A processor interconnect network for operating a printing press, comprising:

a plurality of different modules;

each of said different modules having a means for processing;

control means for interconnecting a plurality of ports of said control means, said plurality of ports connected to said means for processing in said modules of said printing press in a one-to-one correspondence;

each of said modules being equivalent to a node in a local area network and having a unique address; and said control means and said plurality of modules forming a star network, and said processor interconnect network operating independently of a port of the control means to which each module is connected.

2. The processor interconnect network according to claim 1, wherein at least some modules of said plurality of modules are DRINKS, each having a unique address.

3. The processor interconnect network according to claim 1, wherein each of said DRINKS has a plurality of functions operating in response to instructions received via said control means.

4. The processor interconnect network according to claim 1, wherein the processor interconnect network is a network layer of an International Standards Organization (ISO) model, said model having in order of decreasing hierarchy from a network layer, a data link layer, a physical layer and a physical medium.

* * * * *